(12) United States Patent
Ginetti et al.

(10) Patent No.: US 9,348,960 B1
(45) Date of Patent: May 24, 2016

(54) METHOD, SYSTEM, AND COMPUTER PROGRAM PRODUCT FOR PROBING OR NETLISTING A MULTI-FABRIC ELECTRONIC DESIGN SPANNING ACROSS MULTIPLE DESIGN FABRICS

(71) Applicant: Cadence Design Systems, Inc., San Jose, CA (US)

(72) Inventors: Arnold Ginetti, Antibes (FR); Taranjit Singh Kukal, Delhi (IN); Vikas Kohli, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/503,404

(22) Filed: Oct. 1, 2014

Related U.S. Application Data

(60) Provisional application No. 62/033,607, filed on Aug. 5, 2014.

(51) Int. Cl.
*G06F 17/50* (2006.01)
(52) U.S. Cl.
CPC .................................. *G06F 17/505* (2013.01)
(58) Field of Classification Search
CPC ................................................... G06F 17/5045
USPC ................................................. 716/101, 102
See application file for complete search history.

(56) References Cited

U.S. PATENT DOCUMENTS

| | | | | |
|---|---|---|---|---|
| 6,353,612 B1 * | 3/2002 | Zhu | .......................... | H04L 43/12 370/360 |
| 6,401,128 B1 * | 6/2002 | Stai | ................... | H04L 29/12009 709/236 |
| 8,347,261 B2 | 1/2013 | Ginetti et al. | | |
| 8,364,656 B2 | 1/2013 | Arora et al. | | |
| 8,438,524 B1 | 5/2013 | Kohli et al. | | |
| 8,452,582 B1 | 5/2013 | Al-hawari et al. | | |
| 8,453,136 B1 | 5/2013 | Hahn et al. | | |
| 8,479,134 B2 | 7/2013 | Bhattacharya et al. | | |
| 8,521,483 B1 | 8/2013 | Kukal et al. | | |
| 8,527,929 B2 | 9/2013 | Bhattacharya et al. | | |
| 8,527,934 B2 | 9/2013 | Ginetti et al. | | |
| 8,566,767 B1 | 10/2013 | Kukal et al. | | |

(Continued)

OTHER PUBLICATIONS

Hon-Chi Ng, "Cpr E 305 Laboratory Tutorial ¾ Verilog Syntax: Summary of Verilog Syntax" Last Updated: Feb. 7, 2001.

(Continued)

*Primary Examiner* — Sun Lin
(74) *Attorney, Agent, or Firm* — Vista IP Law Group, LLP

(57) ABSTRACT

Described are methods and systems for netlisting or probing multi-fabric designs that identify a request for process at least a portion of a multi-fabric electronic design and determine a first partial listing of one or more first circuit components in response to the request by at least identifying first design data in a first design fabric of the one or more first circuit components using a first session of a first electronic design automation (EDA) tool. The methods and systems further automatically transmit a request for action related to the one or more first circuit components from the first session to a second session of a second EDA tool and determine a second partial listing of one or more second circuit components by at least identifying second design data in a second design fabric of the one or more second circuit components using the second session.

20 Claims, 12 Drawing Sheets

(56) References Cited

U.S. PATENT DOCUMENTS

| | | | |
|---|---|---|---|
| 8,594,988 B1 | 11/2013 | Spyrou et al. | |
| 8,631,181 B2 * | 1/2014 | Feehrer | G06F 13/24 710/260 |
| 8,645,894 B1 | 2/2014 | Kukal et al. | |
| 8,656,329 B1 | 2/2014 | Kukal et al. | |
| 8,719,754 B1 | 5/2014 | Ginetti | |
| 8,732,636 B2 | 5/2014 | Ginetti et al. | |
| 8,732,651 B1 | 5/2014 | Kukal et al. | |
| 8,762,906 B2 | 6/2014 | Ginetti et al. | |
| 8,769,455 B1 | 7/2014 | Singh et al. | |
| 8,806,405 B2 | 8/2014 | Colwell | |
| 8,898,039 B1 | 11/2014 | Kukal et al. | |
| 8,910,100 B1 | 12/2014 | Wilson et al. | |
| 2003/0051222 A1 | 3/2003 | Williams et al. | |
| 2003/0196182 A1 | 10/2003 | Hahn | |
| 2004/0034842 A1 * | 2/2004 | Mantey | G06F 17/5077 716/102 |
| 2005/0273732 A1 * | 12/2005 | Xu | G06F 17/5063 716/122 |
| 2006/0111884 A1 | 5/2006 | McGaughy et al. | |
| 2007/0229537 A1 | 10/2007 | Kohli et al. | |
| 2008/0301600 A1 * | 12/2008 | Kumagai | G06F 17/5045 716/100 |
| 2009/0007031 A1 | 1/2009 | Ginetti et al. | |
| 2010/0031209 A1 | 2/2010 | Luan et al. | |
| 2010/0115207 A1 | 5/2010 | Arora et al. | |
| 2010/0306729 A1 | 12/2010 | Ginetti | |
| 2011/0041106 A1 | 2/2011 | Li et al. | |
| 2011/0061034 A1 | 3/2011 | Ginetti et al. | |
| 2011/0153288 A1 | 6/2011 | Bhattacharya et al. | |
| 2011/0153289 A1 | 6/2011 | Bhattacharya et al. | |
| 2011/0154276 A1 * | 6/2011 | Bhattacharya | G06F 17/5077 716/100 |
| 2011/0161899 A1 | 6/2011 | Ginetti et al. | |
| 2011/0161900 A1 | 6/2011 | Ginetti et al. | |
| 2011/0173582 A1 * | 7/2011 | Bhattacharya | G06F 17/5081 716/106 |
| 2012/0047434 A1 | 2/2012 | Ginetti | |
| 2013/0097572 A1 | 4/2013 | Ginetti et al. | |
| 2013/0246900 A1 | 9/2013 | Ginetti et al. | |
| 2013/0290834 A1 | 10/2013 | Ginetti et al. | |
| 2014/0123094 A1 | 5/2014 | Colwell et al. | |
| 2014/0223402 A1 * | 8/2014 | Satou | G06F 17/5068 716/126 |

OTHER PUBLICATIONS

Stuart Sutherland, "Verilog HDL: Quick Reference Guide" 2001.
"Summary of Verilog Syntax" URL: http://www.verilogtutorial.info/chapter_3.htm, 2007, Accessed on Sep. 2, 2014.
Non-Final Office Action dated Apr. 13, 2015 for U.S. Appl. No. 14/503,408.
Non-Final Office Action dated Apr. 16, 2015 for U.S. Appl. No. 14/503,407.
Notice of Allowance dated Aug. 21, 2015 for U.S. Appl. No. 14/503,406.
Notice of Allowance dated Oct. 28, 2015 for U.S. Appl. No. 14/503,407.
Notice of Allowance dated Oct. 29, 2015 for U.S. Appl. No. 14/503,408.

* cited by examiner

METHOD, SYSTEM, AND COMPUTER PROGRAM PRODUCT FOR PROBING OR NETLISTING A MULTI-FABRIC ELECTRONIC DESIGN SPANNING ACROSS MULTIPLE DESIGN FABRICS

CROSS-REFERENCE TO RELATED PATENT APPLICATIONS

This patent application claims the benefit of U.S. Prov. Patent App. Ser. No. 62/033,607 filed on Aug. 5, 2014 and entitled "METHOD, SYSTEM, AND COMPUTER PROGRAM PRODUCT FOR IMPLEMENTING, VERIFYING, AND/OR ANALYZING A MULTI-FABRIC ELECTRONIC DESIGN SPANNING ACROSS MULTIPLE DESIGN FABRICS". This application is also cross related to U.S. patent application Ser. No. 14/503,408 filed concurrently and entitled "METHODS, SYSTEMS, AND ARTICLES OF MANUFACTURE FOR BACK ANNOTATING AND VISUALIZING PARASITIC MODELS OF ELECTRONIC DESIGNS", U.S. patent application Ser. No. 14/503,403 filed concurrently and entitled "METHODS, SYSTEMS, AND ARTICLES OF MANUFACTURE FOR IMPLEMENTING A MULTI-FABRIC ELECTRONIC DESIGN SPANNING ACROSS MULTIPLE DESIGN FABRICS", U.S. patent application Ser. No. 14/504,406 filed concurrently and entitled "METHOD, SYSTEM, AND COMPUTER PROGRAM PRODUCT FOR CHECKING, VERIFYING, OR TESTING A MULTI-FABRIC ELECTRONIC DESIGN SPANNING ACROSS MULTIPLE DESIGN FABRICS", and U.S. patent application Ser. No. 14/503,407 filed concurrently and entitled "METHODS, SYSTEMS, AND ARTICLES OF MANUFACTURE FOR ANALYZING A MULTI-FABRIC ELECTRONIC DESIGN AND DISPLAYING ANALYSIS RESULTS FOR THE MULTI-FABRIC ELECTRONIC DESIGN SPANNING AND DISPLAYING SIMULATION RESULTS ACROSS MULTIPLE DESIGN FABRICS". The contents of the aforementioned U.S. provisional patent application and U.S. patent applications are hereby incorporated by reference in their respective entireties for all purposes.

BACKGROUND

In conventional electronic designs, the integrated circuits, the IC packaging, and the printed circuit boards are often developed and designed independently. Modern electronic designs often include integrated circuits (ICs), their respective package designs, and a printed circuit board (PCB) incorporating multiple packaged integrated circuits to be developed in a multi-fabric environment. That is, one designer may need or desire to design in the context of the others. For example, the integrated circuit designer may need or desire to implement the integrated circuit design in view of the contexts of the packaging fabric as well as the printed circuit board fabric.

Similarly, a printed circuit board designer may often desire to implement or tune the printed circuit design in the context of the packaging design fabric and/or the integrated circuit design fabric. As a practical example, consider the situation where an advanced package is to be incorporated onto a PCB for a consumer product that is driven by cost considerations and performance. In conventional approaches, while device placement and assignment decisions made solely in the context of the chip may yield the ideal chip-level design, these device placement and assignment decisions could nevertheless result in missing the cost or performance goals for the end consumer product. In these convention approaches, the chip-level placement usually dictates, for example, the bump and ball assignments in the downstream fabrics that may result in excessive coupling in, for example, the interfaces and a complex routing scheme that requires additional layers in the package and/or PCB substrates.

Therefore, there exists a need for a multi-fabric design environment that provides a coherent framework to integrate the integrated circuit design fabric, the packaging design fabric, and the printed circuit board fabric in a seamless manner.

SUMMARY

Disclosed are method(s), system(s), and article(s) of manufacture for probing and netlisting a multi-fabric electronic design across multiple design fabrics in one or more embodiments. Some embodiments are directed at a method for probing and netlisting a multi-fabric electronic design across multiple design fabrics. The method may identify a request for processing at least a portion of a multi-fabric electronic design, determine a first partial listing of one or more first circuit components in response to the request by at least identifying first design data in a first design fabric of the one or more first circuit components using a first session of a first electronic design automation (EDA) tool, automatically transmit a request for action related to the one or more first circuit components from the first session to a second session of a second EDA tool, and determining a second partial listing of one or more second circuit components by at least identifying second design data of the one or more second circuit components in a second design fabric using the second session of the second electronic design automation (EDA) tool.

In some embodiments, processing at least a portion of the multi-fabric electronic design includes netlisting the multi-fabric electronic design, and the method may further aggregate the first partial listing and the second partial listing and generate a netlist to incorporate the net based at least in part upon results of aggregating the first partial listing and the second partial listing. In addition or in the alternative, the method may further identify first design data for the first partial listing in a first design fabric, wherein the first design data are native to the first EDA tool and non-native to the second EDA tool, identify second design data for the second partial listing in a second design fabric, wherein the second design data are native to the second EDA tool and non-native to the first EDA tool, and representing at least a part of the first design data and the second design data with graphical or textual emphasis, wherein the processing the at least the portion of the multi-fabric electronic design includes probing the multi-fabric electronic design.

The first design data may be represented as one or more first symbolic views in the second session of the second EDA tool. Alternatively or additionally, the second design data may be represented as one or more second symbolic views in the first session of the first EDA tool. In some embodiments, the method that automatically transmits the request for action may further determine pertinent information for crossing from the first design fabric into the second design fabric based at least in part upon the one or more first circuit components and transmit the pertinent information from the first session of the first EDA tool to the second session of the second EDA tool. In some of these embodiments, the method may also continue to process the multi-fabric electronic design in the second design fabric using the second session of the second EDA tool based at least in part upon the pertinent information.

In some embodiments, the method may identify first design related information for the one or more first circuit components and identify second design related information for the one or more second circuit components, wherein the first design related information or the second design related information includes electrical data or parasitic data. In addition or in the alternative, the first design data may be represented with textual and/or graphical emphasis, and the second design data may be represented with the textual and/or graphical emphasis. In some of these immediately preceding embodiments, the textual and/or graphical emphasis may be selected based at least in part upon the first design related information and/or the second design related information.

In some embodiments, the method may represent the first design data in the first design fabric and the second design data in the second design fabric in a same format and combine the first design data and the second design data in the same format into a netlist for the multi-fabric electronic design. In addition or in the alternative, the first session accesses the first design data; the second session accesses the second design data; and the first EDA tool and the second EDA tool do not share design data of the multi-fabric electronic design. The multi-fabric electronic design includes a partial, incomplete design that includes no design data for at least one design component, and the multi-fabric electronic design does not satisfy one or more design rules or constraints before the request for processing the multi-fabric electronic design is fulfilled in some embodiments.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
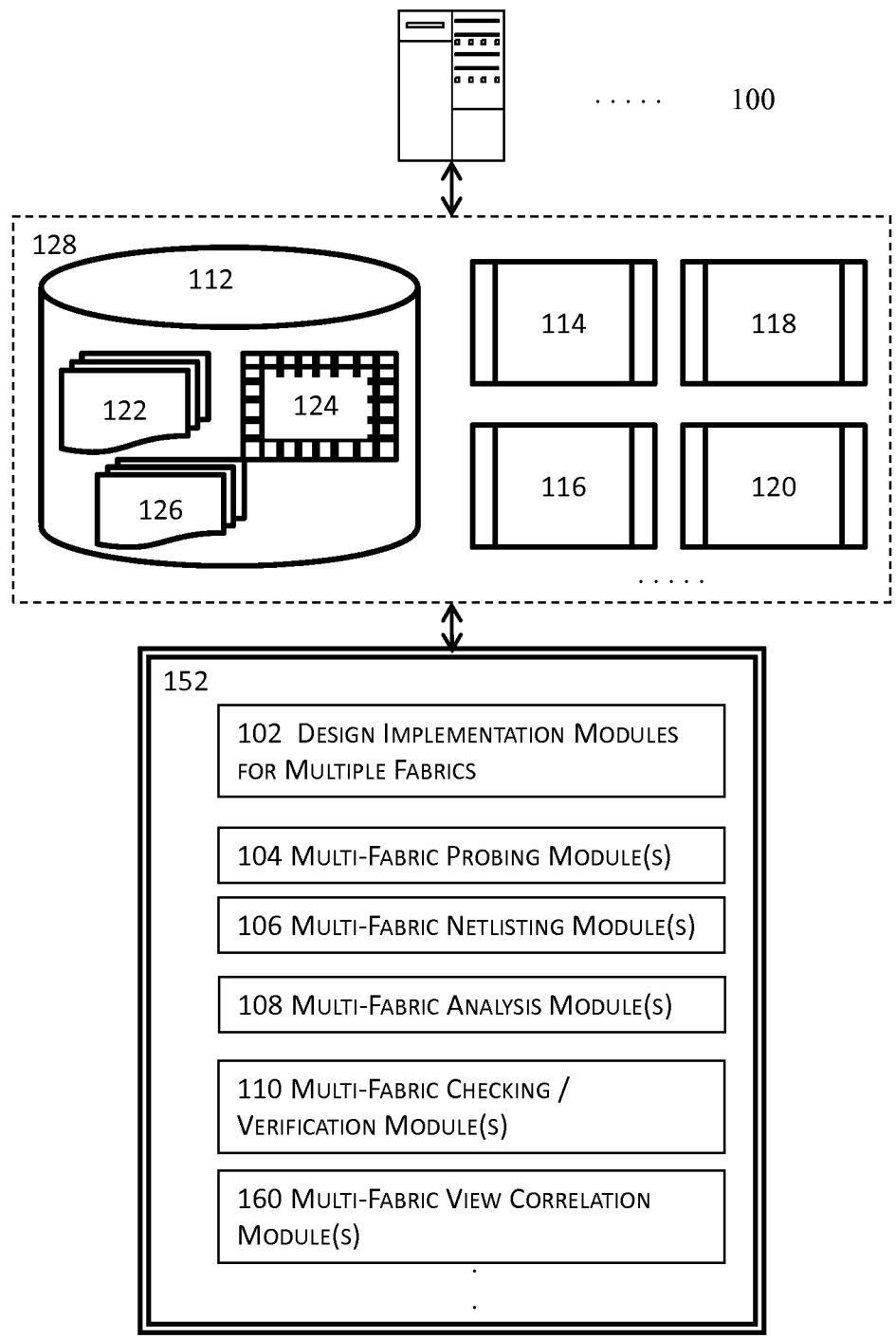
FIG. 1 illustrates a high level block diagram of a system for probing and netlisting a multi-fabric electronic design across multiple design fabrics in some embodiments.

Various embodiments of the invention are directed to methods, systems, and articles of manufacture for implementing, verifying or checking, and analyzing a multi-fabric electronic design across multiple design fabrics. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Various embodiments perform planning and/or implementation of electronic devices across multiple fabrics within the context of each other to ensure proper performance as well as flexibility to work at a coarse level to establish initial placement then refine down to the individual byte lanes as a design emerges. In addition, these embodiments provide designers with the capability to quickly effectuate design changes (e.g., placement and net changes) in one fabric and immediately see the impact on adjacent fabrics by uniting design information or data of various sources and formats across multiple fabrics at various granularities and also by communicating data back and forth for the design implementation tools (e.g., electronic design automation or EDA tools) in multiple design fabrics to complete their respective designs.

These embodiments establish the relationship between the chip, chip package, the board, and the test bench by using hierarchy management techniques to establish and manage the relationships among the fabrics to enable representations of the complete system from the chip-level to the PCB (printed circuit board), while maintaining the integrity of individual design fabrics and providing simultaneous access to domain-specific and/or design fabric-specific data (e.g., macro placement, I/O pad ring devices, bump patterns, ball pad assignments, and placement of critical PCB components and connectors, etc.) These embodiments manage and manipulate a range of multi-fabric data at various stages of completeness of the design, and adapt as portions of the design become less abstract or more complete during the planning and/or implementation process.

In some embodiments, the techniques and methodologies described herein provide a multi-fabric design environment in an efficient and cost effective manner. One embodiment may implement such a multi-fabric design environment including various details of the packaging design and the printed circuit board design at different abstraction or hierarchical levels with different granularities in one or more integrated circuit design tools (e.g., a layout editor or a schematic editor). Such an implementation may leverage the editing, simulation, checking, verifying, testing, and analysis capabilities of the one or more integrated circuit design tools. Some embodiments may use different sets of design constraints or design rules (e.g., constraints or rules for a die design versus constraints or rules for a printed circuit board design) or even different domains of characteristics (e.g., electrical characteristics of electronic circuit designs versus physical characteristics of packaging or printed circuit board designs) of integrated circuit designs, packaging designs, and printed circuit board designs in performing various functions or acts described herein. Some other embodiments use a single unified set of design constraints or design rules or a single, unified data structure that has one or more common formats to accommodate different domains of characteristics in performing the functions or acts described herein.

Yet some other embodiments use two or more sets of views for different abstraction levels of the integrated circuit designs, the packaging design, and the printed circuit design. The two or more sets of views for different abstraction levels may include, for example, a set of symbolic views and a set of schematic views or layout views in some of these embodiments. A symbolic view of a block of circuit elements may include a symbol or a place holder for the block and may or may not have the correct dimensions to represent the actual area occupied by the block of circuit elements. A symbolic view of a block of circuit elements may also include some interface information such as the types of ports, terminals, pins, or pads (collectively ports hereinafter) interfacing with external circuit elements, the number of each type of ports, or the identification of each port in some embodiments. In some of these embodiments, a symbolic view of a block of circuit elements may further include the correct dimensions or location of at least one port interfacing with external circuitry. In these aforementioned embodiments, a symbolic view of a block of circuit elements includes some design data of the block at its boundary (e.g., data or information about the interface to external circuit components) yet does not include detailed design data for circuit components inside the boundary of the block.

In some embodiments, a symbolic view of a block of circuit component designs and the corresponding one or more schematic views and/or one or more corresponding layout views of the block at one or more granularities or hierarchical levels may be stored in one or more data structures such that various processes, systems, modules, or even the designers may access any such schematic or layout at the desired granularity or hierarchical level automatically, manually, interactively, or on demand. The two or more sets of view may further include other views such as layout views, gate level views, etc. at various other abstraction levels. With these two or more sets of views, these embodiments provide each design tool in each fabric with the appropriate set of views such that the design tool can properly perform its dedicated functionality.

A multi-fabric electronic design may have a hybrid hierarchy including a plurality of design fabrics, some of which may be included in others to form a hierarchical structure. For example, a PCB design may exist at a first hierarchical level in the PCB design fabric. The PCB design may further include an IC package which exists at a second hierarchical level under the first hierarchical level, and the IC package design may belong to the package design fabric. The IC package design may further include the IC design at a third hierarchical level for the IC design fabric under the second hierarchical level, at which the IC package design is situated. Unlike conventional hierarchical designs, the designers are not freely to ascend or descend the hierarchical structure because designs in different design fabrics may be described in different languages or formats and thus do not communicate with each other to provide the freedom for designers to freely move from one design fabric in one EDA tool session to another design fabric in another EDA tool session.

For example, some embodiments may provide the integrated circuit schematic view including the schematic design of a cell to the schematic editor or a schematic simulator such that the schematic editor may properly implement or simulate the schematic design represented by the integrated circuit schematic view. As another example, these embodiments may further provide a schematic view including the schematic design of a printed circuit board or an IC packaging design to the printed circuit board schematic editor or IC packaging schematic editor, respectively. These two or more sets of views may be stored in parallel and linked automatically in a streamline fashion such that a designer may navigate among different abstraction levels at various granularity levels. Moreover, various views at various granularity levels in different design fabrics may be tracked using one or more data structures that link, for example, a specific view (e.g., a schematic view of a cell) to the appropriate information or data (e.g., schematic design data of the cell). These one or more data structures may be of the same format or of different formats.

In addition or in the alternative, some embodiments may further provide symbolic views of circuit block designs or portions thereof to an electronic circuit design tool that performs its dedicated or intended functions in light of one or more other designs in one or more other fabric(s) as represented by the symbolic views. For example, the integrated circuit designer may use the integrated circuit schematic editor or simulator or layout editor to implement the physical design of an IC in light of the IC packaging design fabric and/or the printed circuit board design fabric. These embodiments may then provide the IC packaging design as a symbolic IC packaging design view and/or the printed circuit board design as a symbolic printed circuit board design view to the IC designer such that the IC designer may implement the IC design within the context and in light of the pertinent information of the IC packaging and/or the printed circuit board design.

Similarly, the IC packaging designer may also be provided with a symbolic integrated circuit design view for the integrated circuit design having sufficient design information or data for the IC packaging designer to implement or tune the IC packaging design in the context of the integrated circuit design. Each design tool therefore sees what the design tool needs to perform its intended or dedicated functions and is not burdened with unnecessary information that may adversely impacts the performance, effectiveness, and/or functionality of the design tool, while still receiving sufficient information or data from other fabrics or abstraction levels to aid the designer in using the design tool to implement or tweak the respective designs.

In addition to implementing or tweaking (e.g., fixing, improving, or optimizing) a design at a particular abstraction level in a specific fabric, another advantage of these embodiments is that a design team working in different geographies may transmit some form of abstracted design information or data from a first team member (e.g., an IC designer) working in a first fabric at the first location to a second team member (e.g., an IC packaging designer) working in a second fabric at a second location. The second team member may not only implement or tweak his or her own design within the context of the design in the first fabric but also revise and transmit the abstracted design back to the first team member who may in turn accept, partially accept, or reject the revised abstracted design.

Yet another advantage of these embodiments is that these embodiments may better manage large block or cell symbols by splitting a large symbol into multiple split symbols and placing its ports across design schematics, especially near the circuitry to which they are connected. As the complexity of the designs is constantly increasing and more and more logic is being placed inside hierarchical blocks, the number of interfaces that are exposed by the hierarchical block has increased dramatically such that the increased number of interfaces means more pins are required on the block symbol. As a result, a block symbol may become so large (e.g., a device having a large pin count) that it may not be placed on a standard page border. Such a large block symbol (or a block symbolic representation) may also become difficult to manage because of the sheer number of pins coming out of the same symbol.

Various embodiments described herein also better manage hierarchical block symbols by splitting these symbols into multiple split symbols. Rather than generating a big monolithic symbol, these embodiments provide an option to split the ports of a hierarchical block over multiple symbols. Splitting a large symbol into multiple split symbols reduces the size of the large symbol. In addition, these embodiments may logically categorize the ports and placed these ports on different symbols to create symbols that may be placed across, for example, schematic sheets, especially near the circuitry to which they connect to. In splitting a larger symbol or representation into multiple, smaller symbols or representations, an identification (e.g., a name or other types of identifier) may also be split into multiple split identifications corresponding to the multiple, smaller symbols.

In one or more embodiments, FIG. 1 shows an illustrative high level schematic block diagrams for implementing a multi-fabric electronic design across multiple design fabrics and may comprise one or more computing systems 100, such as a general purpose computer described in the System Architecture Overview section to implement one or more special proposes. In some embodiments, the one or more computing systems 100 may invoke various system resources such as the processor(s) or processor core(s), memory, disks, etc. The one or more computing systems 100 may also initiate or interact with other computing systems to access various resources 128 that may comprise a floorplanner, a global routing engine, and/or a detail routing engine 114, a layout editor 116, a design rule checker 118, a verification engine 120, etc. The one or more computing systems 100 may further write to and read from a local or remote volatile or non-volatile computer accessible storage 112 that stores thereupon data or information such as, but not limited to, one or more databases (124) such as schematic design database(s) or physical design database(s), electronic circuit design specification database(s), various statistics, various data, rule decks, various design rules, constraints, etc. (122), or other information or data (126) that may be used to facilitate the performance of various functions to achieve the intended purposes.

In some embodiments, the one or more computing systems 100 may, either directly or indirectly through various resources 128 to invoke various software, hardware modules or combinations thereof in a multi-fabric design environment 152 that may comprises a plurality of design implementation modules 102 (e.g., schematic design tool, layout tool, etc.) to insert, remove, modify, improve, optimize, or otherwise operate upon designs in different fabrics (e.g., the die design fabric, the integrated circuit or IC packaging design fabric, the printed circuit board or PCB design fabric, the test bench design fabric, etc.), one or more multi-fabric probing modules 104 to probe multi-fabric designs across multiple design fabrics, one or more multi-fabric netlisting modules 106 to netlist multi-fabric designs across multiple design fabrics, one or more multi-fabric analysis modules 108 to simulate or analyze multi-fabric design across multiple design fabrics, one or more check or verification modules 110 to check or verify the correctness of multi-fabric designs across multiple design fabrics, and one or more multi-fabric view correlation modules 160 to correlate various symbolic views, schematic views, and/or layout views with the schematic design data or the layout data in different design fabrics at various hierarchical levels, etc.

A symbolic view of a block of circuit elements may include a symbol or a place holder for the block and may or may not have the correct dimensions to represent the actual area occupied by the block of circuit elements. A symbolic view of a block of circuit elements may also include some interface information such as the types of ports, terminals, pins, or pads (collectively ports hereinafter) interfacing with external circuit elements, the number of each type of ports, or the identification of each port in some embodiments. In some of these embodiments, a symbolic view of a block of circuit elements may further include the correct dimensions or location of at least one port interfacing with external circuitry. In these aforementioned embodiments, a symbolic view of a block of circuit elements includes some design data of the block at its boundary (e.g., data or information about the interface to external circuit components) yet does not include detailed design data for circuit components inside the boundary of the block. In some embodiments, a symbolic view of a block of circuit component designs and the corresponding one or more schematic views and/or one or more corresponding layout views of the block at one or more granularities or hierarchical levels may be stored in one or more data structures such that various processes, systems, modules, or even the designers may access any such schematic or layout at the desired granularity or hierarchical level automatically, manually, interactively, or on demand.

In some embodiments, a symbolic view may be stored or linked together with a schematic view or layout view of a circuit component, block, or cell by using, for example, a profile. The profile may further include or be associated with other information or data including, for example, parasitic information (e.g., capacitances, resistances, etc.), electrical information (e.g., currents, voltages, inductances, etc.), physical information (e.g., sizes or profiles of various shapes, etc.), timing or delay information of the electronic design of interest, other performance-related information, analysis results (e.g., EMI or electromagnetic interference analyses, ISI or inter-symbol interference analyses, cross-talk analyses, etc.), simulation results in various domains and/or fabrics, or any combinations thereof in some of these embodiments. The multi-fabric view correlation module 160 may also correlate the aforementioned information or data with the multi-fabric electronic design, a portion thereof, or the corresponding designs of circuit component in the multi-fabric electronic design. In some embodiments, the multi-fabric view correlation module 160 may further annotate the pertinent portions or circuit component designs with some or all of the aforementioned information or data.

Figure 2A:
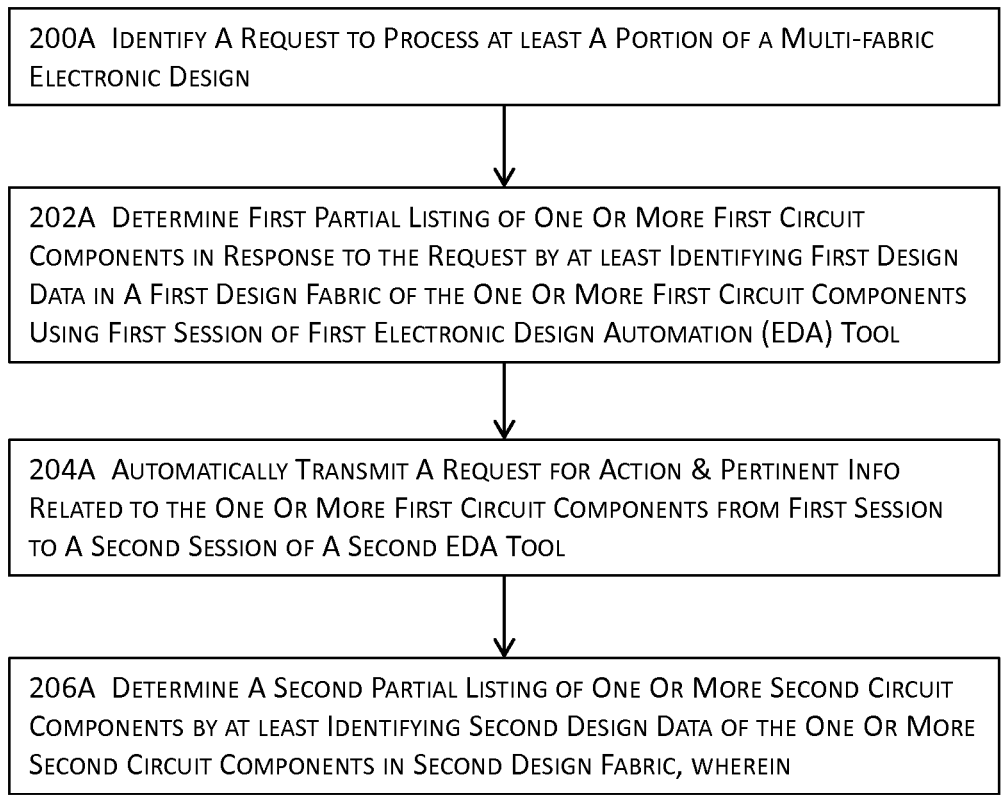
FIG. 2A illustrates a high level block diagram of a method or system for probing or netlisting a multi-fabric electronic design across multiple design fabrics in some embodiments.

FIG. 2A illustrates a high level block diagram for a system for probing or netlisting a multi-fabric electronic design across multiple design fabrics in some embodiments. In these illustrated embodiments, the method or system may identify a request for processing at least a portion of a multi-fabric electronic design at 200A. The request for processing may include a request for probing at least a portion of the multi-fabric electronic design in some embodiments or a request for netlisting at least a portion of the multi-fabric electronic design in some other embodiments. For example, the method or system may receive a request to probe a net to determine which net segments in which specific design fabric are part of the net and/or which other information or data are associated with the net segments in some embodiments. In some of these embodiments, probing may determine the list of net segment for the entire net from its source to its destination across multiple design fabrics. In addition or in the alternative, probing may also determine data or information associated with a particular net or various nodes along the particular net. For example, probing may identify or determine various electrical data (e.g., nodal voltages, currents, current densities, electro-migration data, etc.) or physical or electrical parasitics (e.g., dimensional data, temperatures, resistances, capacitances, inductances, etc.) at various nodes or portions of a net. Probing results may be textually and/or graphically emphasized in a user interface. As another example, a net connecting a first pin at the top level of a test bench through a first net to a first IC package in a PCB, a second net from the first IC package to a die, and a third net within the die may be identified with the same textual or graphical emphasis or annotations (e.g., with the same line type, line size, color, or other annotations) through probing.

A first partial listing of one or more first circuit components may be determined in response to the request by at least identifying first design data of the one or more first circuit components in a first design fabric using a first session of a first EDA tool at 202A. For example, a user may provide an input to probe a net or a terminal along the net in a PCB design by clicking on the net or the terminal in the PCB design. The method or system may receive the user's input for probing and identify one or more circuit components such as net segments, pins, devices, or other circuit components with a PCB design tool session in response to the request for probing at 202A. The PCB design tool is however unable to access the design data outside of the PCB design fabric and thus cannot identify any circuit components in, for example, IC packages in the PCB design. As another example, the method or system may receive a request for netlisting a PCB design. The method or system may then begin the netlisting process with a first net and identify the net segments for the first net with a PCB design tool until the PCB design tool encounters design data in other design fabrics.

At 204A, the method or system may transmit a request for action that is related to the request for processing from the first session of the first EDA tool to a second session of a second EDA tool. In some embodiments, the request for action may include or be associated with one or more commands or scripts to instantiate the second session of the EDA tool. In some embodiments, the method or system may further identify some pertinent information that is related to the request for processing and may be used to continue the processing (e.g., probing or netlisting) into the second design fabric with a second EDA tool.

The pertinent information or data may include the interface information or data about the interface between two fabrics in some embodiments. In an example of probing a net connecting the first and the second IC packaging designs in a PCB design, the pertinent information or data may include the identifications of the input or output ports, pins, pads, or terminals of the first or the second IC packaging design, any electrical or parasitic data associated with the input or output ports, pins, pads, or terminals of the first or the second IC packaging design, any schematic or layout views, the schematic or layout design data associated with the schematic or layout views at various hierarchical or granular levels, any symbolic views and their corresponding schematic and/or layout views, or any combinations thereof in some embodiments. In addition or in the alternative, the pertinent information or data may include the identifications of the input or output ports, pins, pads, or terminals of the first or the second IC packaging design, any electrical or parasitic data associated with the input or output ports, pins, pads, or terminals of the first or the second IC packaging design, any schematic or layout views, the schematic or layout design data associated with the schematic or layout views at various hierarchical or granular levels, any symbolic views and their corresponding schematic and/or layout views, or any combinations thereof in some embodiments.

The second EDA tool may be associated with a second design fabric to natively access the design data in the second design fabric but cannot natively access the first design data of the one or more first circuit components in the first design fabric, without transforming, translating, mapping, or compiling the first design data into a recognizable format. In some of these embodiments, the first design data in the first design fabric are native to the first EDA tool and non-native to the second EDA tool. In these embodiments, non-native design data may be represented as one or more symbolic representations in the EDA tool session to which the non-native design data are not native. For example, the second design data may be represented as one or more symbolic representations in the first EDA tool session, and the first design data may be represented as one or more symbolic representations in the second EDA tool session. In some of these embodiments, the design data in the second design fabric are native to the second EDA tool and non-native to the first EDA tool.

Design data are native to an EDA tool if the EDA tool may be used to generate, access, modify, and/or maintain the design data without performing any transformation, mapping, export, or abstraction on the design data in some embodiments. In some of these embodiments, only design data that are native to an EDA tool are visible to and accessible by the EDA tool. On the other hand, design data are non-native to an EDA tool if the EDA tool cannot access the design data without performing some transformation, exportation, or mapping on the design data. In some of these embodiments, design data that are non-native to an EDA tool are invisible to and hence inaccessible by the EDA tool.

At 206A, the method or system may determine a second partial listing of one or more second circuit components by at least identifying second design data in the second design fabric. In some embodiments, the method or system may identify the second design data in a format for the partial listing. For example, the method or system may identify a listing of net segments of one or more nets in the second design fabric in a data exchange format that is neutral or independent of EDA tools at 206A. The data exchange format may include, for example the Electronic Design Interchange Format (EDIF) or plain text for netlisting in some embodiments. In this example, at least some of the one or more nets identified at 206A are interconnected with the corresponding one or more circuit components in the first design fabric via, for example, respective pins or terminals at or near the boundary between the first and the second design fabrics. This listing of net segments identified at 206A may further be aggregated with the first design data identified at 202A to form at least a part of a netlist or of the probing results.

In these embodiments, the method or system may thus initiate the probing or netlisting process in the first design fabric and continue the probing or netlisting into the second design fabric by using the second session of the second EDA tool. In these embodiments, at least some of the one or more second circuit components in the second design fabric are operatively connected to the corresponding one or more first circuit components in the first design fabric.

In some of these embodiments illustrated in FIG. 2A, the first EDA tool has no complete connectivity information for the non-native design data although the first EDA tool may nevertheless have some incomplete connectivity or design information for the non-native data in some of these embodiments. For example, the first EDA tool may have information or knowledge (e.g., identifications, directions, constraints, power sensitivities, etc. of pins, terminals, or pads) about the interface elements at or near the interface between the first design fabric and the second design fabric but have otherwise no information or knowledge about the connectivity for interconnections further away from the interface. In some of these embodiments, no single design fabric includes the complete visibility of the entire design at any hierarchical level. In some embodiments, the first EDA tool has no connectivity information of non-native design data at all. Rather, the first EDA tool may be made aware of various interface elements in the design fabric whose design data are native to the first EDA tool. In these embodiments, the first EDA tool may compare the identification of a pin in the native design data to the corresponding information in a request (e.g., the request for action transmitted from another EDA tool associated with anther design fabric) to continue the processing in order to fulfill the request for netlisting or probing the multi-fabric electronic design.

Figure 2B:
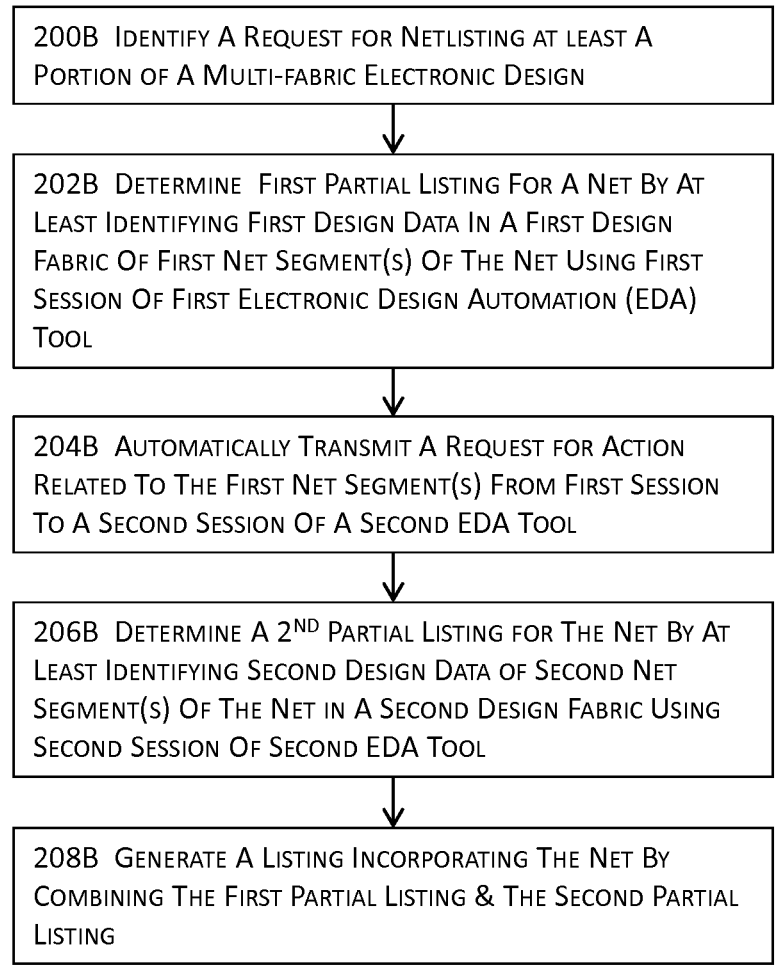
FIG. 2B illustrates a more detailed block diagram of a method or system for netlisting a multi-fabric electronic design across multiple design fabrics in some embodiments.

FIG. 2B illustrates a more detailed block diagram for a method or system for netlisting a multi-fabric electronic design across multiple design fabrics in some embodiments.

In these embodiments, the method or system may first identify a request for netlisting at least a portion of a multi-fabric electronic design at 200B in identical or substantially similar manners as those described in FIG. 2A. The method or system may further determine a first partial listing of a net in the portion by at least identifying first design data of one or more first net segments of the net in a first design fabric by using a first session of a first EDA tool at 202B. In some embodiments, the first session of the first EDA tool may use the first connectivity information, which includes the information of how nets are connected in an electronic design, for the first design fabric to identify the one or more first net segments for the net. In some other embodiments, the method or system may identify a starting point of the net (e.g., the source node, the destination node, or any other node along the net) and traverse the net from the starting point in one or both directions to identify the one or more first net segments of the net. The first partial listing for the net may be identified and temporarily or permanently stored in a netlist, which may be further updated as the netlisting process continues in the first design fabric or even further into one or more other design fabrics. In some embodiments, the first partial listing may be identified and stored in a neutral data exchange format including, for example, the EDIF format or the plain text format.

At 204B, the method or system may generate a request for action from the first session of the first EDA tool to a second session of a second EDA tool. In some embodiments where the second session of the second EDA tool already exists, the method or system may use the first session of the first EDA tool to identify the second session and transmit the request for action to the second session of the second EDA tool. In some other embodiments where the second session of the second EDA tool does not yet exist, the method or system may use the request for action to instantiate or cause to instantiate the second session of the second EDA tool and then transmit the request for action to the second session. A request for action may thus include one or more commands or one or more scripts that may be utilized by, for example, an application programming interface to instantiate an EDA tool session in some embodiments. A request for action may include a message that may be transmitted by, for example, a message passing system in some other embodiments. Similar to the request for action described in 204A, the request for action may further include or associate with some pertinent information that may be used to continue netlisting the portion of the multi-fabric electronic design. In other words, such pertinent information may be included in or accompanied by the request for action to the second session of the second EDA tool.

At 206B, the method or system may use the identified or instantiated session of the second EDA tool to determine a second partial listing for the net by at least identifying the second design data of one or more second net segments of the net in the second design fabric. The method or system may identify the second partial listing in the same format as the first partial listing for the first design fabric in some embodiments. For example, both the first EDA tool session and the second EDA tool session may identifying their respective partial listing in a neutral data exchange format in some embodiments. In some other embodiments, the method or system may transform, map, translate, or covert (collectively transform) the second partial listing into the same format as the first partial listing identified in the first design fabric.

At 208B, the method or system may generate a netlist or update an existing netlist to incorporate the net by aggregating the first partial listing from the first design fabric and the second partial listing from the second design fabric. In some embodiments where the first design fabric is native to the first EDA tool and the second design fabric is native to the second EDA tool, the method or system may further expose some connectivity information of one EDA tool to the other EDA tool to ensure that the connectivity information included in or implied by the netlist is correct across these two design fabrics. For example, the net name (or a recognized variant thereof) of a net in the PCB design may be associated with the pin of an IC package design symbolic representation in some embodiments, or the net name (or the recognized variant) may be included as a property of the IC package design symbolic representation in some other embodiments.

For example, the multi-fabric electronic design may include a test bench design in an IC schematic editor (the first EDA tool in this example). The test bench design includes a printed circuit board in the form of a symbolic PCB representation and one or more interconnections and/or one or more discrete components. The detailed schematic or layout design data of the printed circuit board may be implemented in a PCB design editor and further include one or more IC packaging designs, one or more interconnections and/or one or more discrete components at the PCB level or in the PCB design fabric. Each IC packaging design may further include the die in the form of a symbolic die representation as well as one or more interconnections between the package design and the die and the package design at the IC packaging design level or in the IC packaging design fabric. The package design and the one or more interconnections between the package design and the die may be generated by and native to an IC packaging design tool.

The described method or system may first identify the circuit components at the test bench level as the first design data that are generated by and native to, for example, an IC schematic editor. A first net may be identified by, for example, identifying a port in the test bench design and traverse the interconnections to the port by using the connectivity information for the test bench design. The method or system may continue to traverse the first net until the traversal is going to reach or reaches, for example, the interface of a PCB. The method or system may then identify the first port, pin, terminal, or pad in the test bench fabric and identify or instantiate a PCB design tool instance. The identified first port, pin, terminal, or pad may be transmitted to the PCB design tool instance so that the PCB design tool instance knows where to continue the traversal. The PCB design tool instance may then use the PCB design connectivity information and the more detailed PCB design data generated by and native to the PCB design tool to continue the traversal of the first net until the traversal is going to reach or reaches the interface of, for example, an IC packaging design.

The method or system may then identify the second port, pin, terminal, or pad in the PCB design fabric with the PCB design tool and identify or instantiate an IC packaging design tool instance. The identified second port, pin, terminal, or pad may be transmitted to the IC packaging design tool instance so that the IC packaging design tool instance knows where to continue the traversal from the second port, pin, terminal, or pad. The IC packaging design tool instance may then use the IC packaging design connectivity information and the more detailed IC packaging design data generated by and native to the IC packaging design tool to continue the traversal of the first net until the traversal is going to reach or reaches the interface of, for example, an IC or a die design.

The method or system may then identify the third port, pin, terminal, or pad in the IC packaging design fabric with the IC packaging design tool and identify or instantiate an IC design tool instance. The identified third port, pin, terminal, or pad may be transmitted to the IC design tool instance so that the IC design tool instance knows where to continue the traversal from the third port, pin, terminal, or pad. The IC design tool instance may then use the IC design connectivity information and the more detailed IC design data generated by and native to the IC design tool to continue the traversal of the first net until the traversal of the first net is completed or a stopping criterion is reached. The results of traversing the first net may then be added to the netlist of the multi-fabric electronic design, and the method or system may further identify another net and repeat the aforementioned processes until all the nets for the multi-fabric electronic design have been identified or until a stopping criterion has been reached (e.g., netlisting the multi-fabric design in the PCB fabric or at a certain hierarchical level).

Figure 2C:
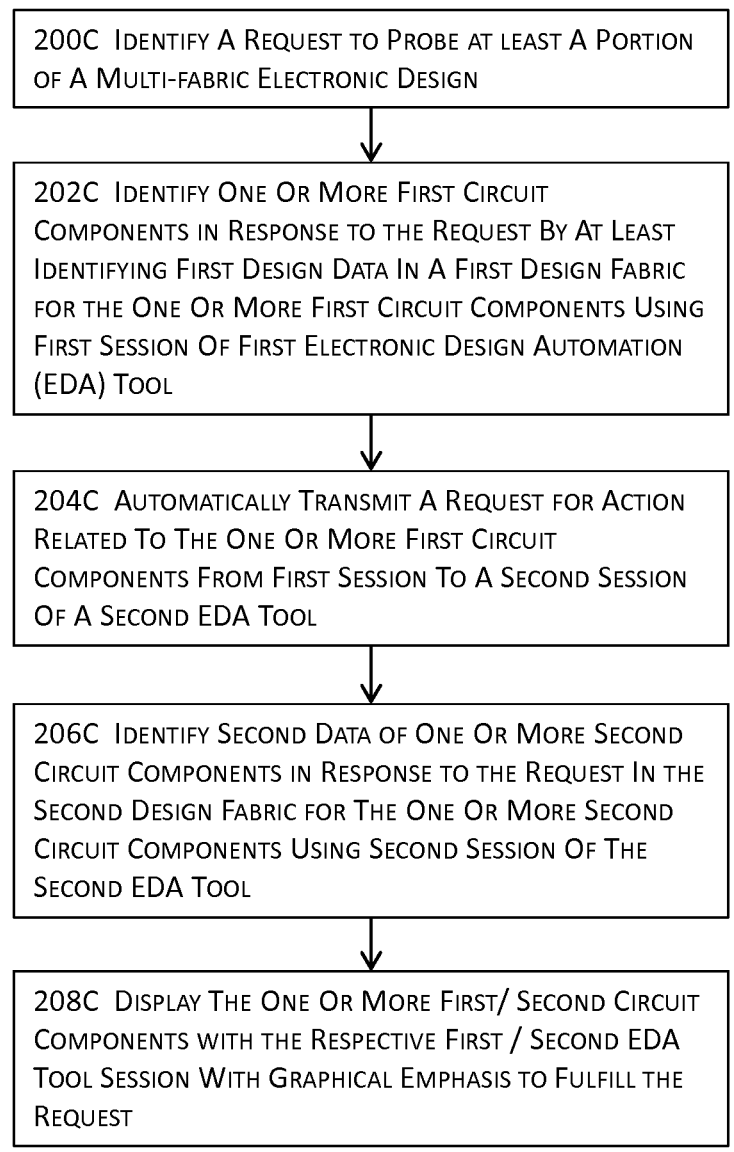
FIG. 2C illustrates a more detailed block diagram of a method or system for probing a multi-fabric electronic design across multiple design fabrics in some embodiments.

FIG. 2C illustrates another flow diagram for a method or system for probing a multi-fabric electronic design across multiple design fabrics based on the description of FIG. 2A in some embodiments. In these embodiments illustrated in FIG. 2C, the method or system may identify a request for probing at least a portion of a multi-fabric electronic design at 200C. The portion of the multi-fabric electronic design may include a node or a point, a circuit component (e.g., a pin, a pad, a terminal, a port, a net, a segment of a net, etc.), or a device in the multi-fabric electronic design. For example, a designer may request for probing a terminal or a pin in a multi-fabric electronic design by clicking on the terminal or net in a user interface. The method or system may also issue a request for probing any portion of a multi-fabric electronic design to, for example, provide information or data to a designer or to other processes for further processing.

At 202C, the method or system may determine one or more first circuit components in response to the request for probing by at least identifying first design data of the one or more first circuit components in a first design fabric by using a first session of a first EDA tool. As described above, the method or system may automatically transmit a request for action that is related to or associated with the one or more first circuit components from the first session of the first EDA tool to a second session of a second EDA tool at 204C. In some embodiments, the method or system may further include some pertinent information in or associate such pertinent information with the request for action and transmit the pertinent information to the second session of the second EDA tool in identical or substantially similar manners as those described for 204A and 204B. The method or system may identify second design data of one or more second circuit components in the second design fabric in response to the request for action at 206C. For example, the method or system may identify a request for probing a net segment in a PCB design, the method or system may first identify the nodes (e.g., terminals, pins, pads, etc.) and net segments interconnected with the net segment and/or other net segments, circuit components, or devices that may be affected by the signals carried by the identified net segments (e.g., potential victim nets for cross-talk analysis) in the PCB design fabric at 202C. At the time or before the PCB design tool encounters design data belonging to another design fabric such as an IC packaging design fabric. The PCB design tool may issue a request for action at 204C to identify or instantiate an IC packaging design tool session to continue to identify one or more circuit components in the IC packaging design fabric to fulfill the request for probing at 206C.

At 208C, the method or system may display the one or more first circuit components and the one or more second circuit components respectively with the session and the second session with graphical emphasis to fulfill the request. In some of these embodiments, the method or system may further identify other information or data that are associated with at least some of the one or more first circuit components and/or the one or more second circuit components. In some embodiments, the method or system may directly display such information or data in a part of the user interface in some embodiments. The method or system may further associate textual, graphical, or both textual and graphical indications with some or all of these circuit components to indicate the availability of such other information or data in some other embodiments. For example, the method or system may insert one or more icons (or other types of identifiers) on or in close proximity of a net in a representation of the multi-fabric electronic design to indicate that some additional information or data are available. The method or system may also use different icons or the same icon with different graphical emphasis to indicate different categories of additional information or data. For example, the method may use a blue icon to indicate the availability of additional electrical data and a green icon to indicate the availability of additional parasitic information.

Figure 3A:
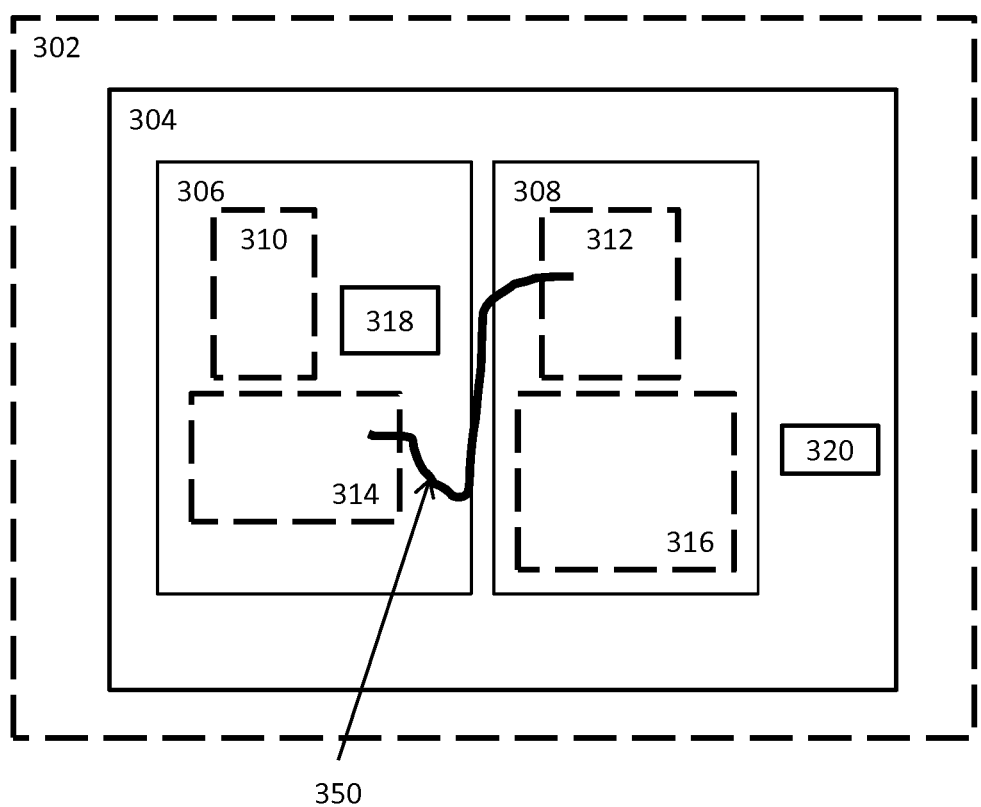
FIG. 3A illustrates a simplified schematic illustration of a multi-fabric electronic design in some embodiments.

Referring to FIG. 3A as an example, the method or system may identify a request for netlist the PCB design 304 including the net 350 that spans across the first IC design 314, the first IC packaging design 306, the PCB design 304, the second IC packaging 308, and the third IC design 312. In other words, net 350 crosses multiple design fabrics—the PCB design fabric, the IC packaging design fabric, and the IC design fabric. The method or system may identify the starting node such as the source node in the first IC 314 (or any other node along net 350) and identify the net segments along net 350 by, for example, using connectivity information or by traversing the net. The method or system may identify the net segments in the first IC design 314 in the IC design fabric with an IC design tool and then identify or instantiate an IC design packaging tool to identify the net segments in the first IC packaging 306. The method or system may further identify or instantiate a PCB design tool to identify the net segments for net 350 in the PCB design 304, which belongs to the PCB design fabric, and then use the identified IC packaging tool session and IC design tool session to identify the respective net segments in the second IC packaging design 308 and the third IC design 312. Each time the netlisting or probing process is about to cross a design fabric boundary into the next design fabric, the EDA tool associated with the design fabric sends a request for action to the next EDA tool associated with the next design fabric as described above so that the next EDA tool may continue the netlisting or probing until the desired or requisite net segments are identified.

Figure 2D:
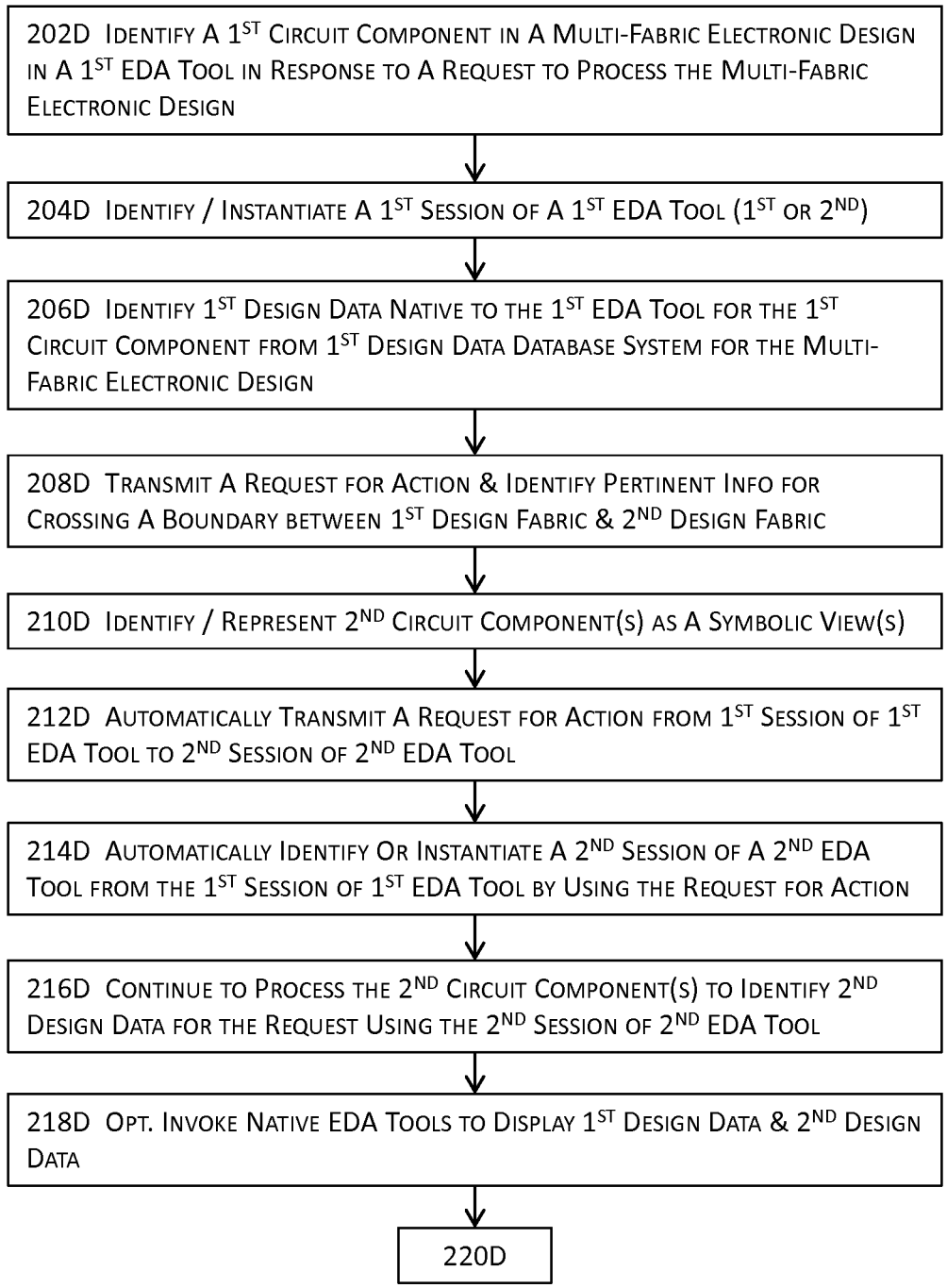
FIGS. 2D-E jointly illustrate a more detailed block diagram of a method or system for probing or netlisting a multi-fabric electronic design across multiple design fabrics in some embodiments.
Figure 2E:
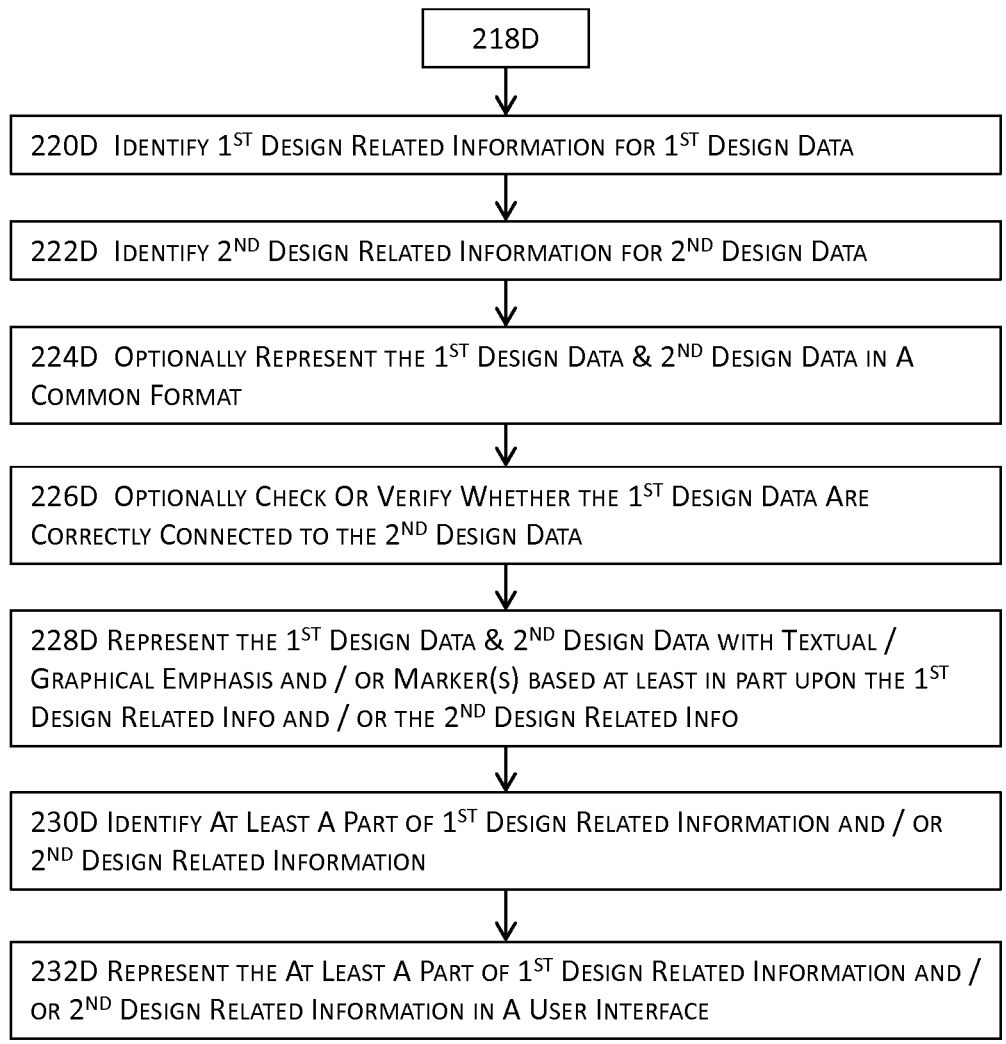

FIGS. 2D-E jointly illustrate a more detailed block diagram for a method or system for probing or netlisting a multi-fabric electronic design across multiple design fabrics in some embodiments. In these embodiments, the method or system may identify a first circuit component in a multi-fabric electronic design in response to a request to process the multi-fabric electronic design at 202D. The first circuit component may include a node or a point, a device for joining electrical circuits together (e.g., a terminal, pin, pad, etc.), a net segment, a net, a device, a block of circuit design, etc. in some embodiments. Processing the multi-fabric electronic design may include probing or netlisting at least a portion of the multi-fabric electronic design.

Probing a circuit component may be initiated automatically by, for example, a function or system call, manually, or interactively by, for example, receiving a user's input via a point device or other human-computer input/output interface in a user interface on a display apparatus. In addition or in the alternative, probing a circuit component may ascend or descend the hierarchies of the multi-fabric electronic design. For example, a user may identify a portion of a circuit component (e.g., a net) at any hierarchical level (e.g., at the test bench hierarchical level, at the printed circuit board hierarchical level, at the IC packaging hierarchical level, or at the die hierarchical level, etc.), and the method or system may, upon receiving the instruction to probe the net, traverse the net in an upward or downward direction or both upward and downward directions through the hierarchical levels to identify the various segments of the net.

In some embodiments, probing a circuit component may also produce associated information or data including, for example, electrical data, identifications of circuit elements from probing the circuit component, forward annotated design information or data (e.g., schematic level data or information annotated in the corresponding layout portion), backward annotated design information or data (e.g., layout level data or information annotated in the corresponding schematic portion), or any combinations thereof, etc. Probing a circuit component may also start or end at any locations as desired or required. For example, the method or system may probe a net or a cell starting from an input pin, port, pad, or terminal and ending at an output pin, port, pad, or terminal at any hierarchical level and in any fabric of the multi-fabric design environment.

In some of these embodiments, the first EDA tool generates, edits, or otherwise manipulates first design data that are native to the first EDA tool for designs in a first fabric and may include, for example, an IC schematic tool (e.g., a schematic editor, schematic simulator, etc.) or an IC layout tool (e.g., an IC layout editor, post-layout simulator(s), post-layout verification tool(s), analog and mixed-signal tool(s), RF or radio frequency design tool, etc.) in the IC design fabric or die fabric.

At 204D, the method or system may identify (if pre-existing) or instantiate (if non-existing) a first session of a first EDA tool to which the first circuit component is native. For example, the method or system may first identify a first schematic instance in an IC schematic at 202D that is part of an IC design fabric and instantiate an IC layout editor session at 204D for the first schematic instance. The method or system may identify first design data that are native to the first EDA tool session for the first circuit component at 206D. In some embodiments, the method or system may identify the first design data from a design data database system for the multi-fabric electronic design at 206D.

In these embodiments, the first design data include the circuit design data for the first circuit component and are stored, administered, or otherwise managed by the first design data database system. Once the first design data are identified at 206D, the method or system may analyze and/or traverse the first circuit component by using, for example, connectivity information to probe the first circuit component. The connectivity information may include, for example, how nets run across various hierarchical levels and/or various design fabrics in some embodiments. The connectivity information may include, for example, how nets are connected at each module or block and thus may correlate the net identifications with the identifications of ports, pins, terminals, pads, etc.

At 208D, the method or system may transmit a request for action from the first EDA tool session to a second EDA tool session so that the second EDA tool session may continue to process second design data that are native to the second EDA tool session but non-native to the first EDA tool session. The second EDA tool generates, edits, or otherwise manipulates second design data that are native to and generated by the second EDA tool for designs in a second fabric and may include, for example, any design tool in another fabric (e.g., the PCB fabric, the IC packaging fabric, etc.) such as a PCT design tool, an IC packaging design tool, etc. In some of these embodiments, the first circuit component may comprise a first net, a cell, or a block of circuit elements that spans across more than one fabric. For example, the first circuit component may span from the IC design fabric in a test bench design, go through the interface of a PCB design in a PCB design fabric, go through another interface of an IC packaging design in an IC packaging design fabric, and eventually ends within an IC design in the IC design fabric.

The method or system may also identify pertinent information that may be referenced for the method or system to process the multi-fabric electronic design across the boundary between the first design fabric and a second design fabric. In some embodiments where the second design data are non-native to the first EDA tool, the method or system may nevertheless expose at least a part of connectivity information that is native to the second EDA tool to the first EDA tool session or vice versa, where the part of connectivity information may be needed for the first EDA tool session to hand off the processing (e.g., probing or netlisting) to the second EDA tool session to the first EDA tool session. In some of these embodiments, this part of connectivity information may be included in or associated with the request for action or a return request for action from the second EDA tool session to the first EDA tool session. The method or system may identify or represent one or more second circuit components in a second design fabric at 210D. In these embodiments, the method or system represent the actual design data (e.g., schematic or layout data) in an EDA tool session to which the actual design data are native and represent other design data non-native to the EDA tool session as one or more symbolic representations. For example, the PCB schematic editor session may display the actual schematic data for the PCB design and symbolic representations for the IC packaging designs or the IC designs enclosed therein that are part of the PCB design.

At 212D, the first EDA tool session may create and transmit a request for action to a second EDA tool session. At 214D, the method or system may automatically identify or instantiate a second EDA tool session by using the request for action transmitted from or executed in the first EDA tool session. For example, the first EDA tool session may execute a part of the request for action to execute, for example, the code compiled from CreateProcess with the correctly set PATH environment variable or using the switch (pid) to instantiate the second EDA tool session.

As another example, the method or system may first identify a part of a net that connects a first IC package and a second IC package across a portion of the PCB in a PCB design. The method or system may identify or instantiate the PCB design tool instance as the EDA tool, identify the design data (e.g., schematic or layout data) of the part of the net in the PCB design, and upon reaching the interface between the first (or second) IC packaging design, identify or instantiate the IC packaging design tool instance via, for example, a system or function call.

At 216D, the method or system may use the second EDA tool session to continue to process the one or more second circuit components in the second design fabric to identify second design data for the fulfill the request. The second design data and the one or more second circuit components are native to the second EDA tool so the second EDA tool session may process them without any transformation.

In an example of probing a net connecting the first and the second IC packaging designs in a PCB design, the method may, upon reaching the interface of, for example, the first IC packaging design, identify the second design data including, for example, the schematic design data or layout design data of the first IC packaging design by using the another EDA tool (e.g., an IC packaging design tool) whose instance has been identified or instantiated at 214D. Moreover, the EDA tool (e.g., a PCB design tool) may only receive a symbolic representation of the first IC packaging design that does not include all the detailed design data of the first IC packaging design. The EDA tool thus identifies or instantiates the PCB design tool instance at 214D to identify the second design data (e.g., the schematic or layout data at some hierarchical or granular level) for the first IC packaging design based at least in part upon the transmitted part of pertinent information or data at 216D. In some embodiments, the second design data and the first design data may be stored in separate databases or separate library files, although these separate databases or separate library files are nevertheless managed by the same first design data database system. In some other embodiments, the method or system may identify the second design data by using the same first design data database system. In some embodiments, the second design data and the first design data may be stored in the same database or even the same library file.

At 218D, the method or system may optionally invoke native EDA tools to display the first design data and the second design data. The first and second design data may include, for example, identifications of corresponding circuit components, connectivity information of circuit components, detailed design data at one or more abstraction levels or granularity levels, or any other suitable information associated with the design of a circuit component.

Referring to FIG. 2E, the method or system may identify first design related information for the first design data at 220D and second design related information for the second design data at 222D. The first and second design related information may include, for example, physical characteristics of circuit components (e.g., size), electrical information of circuit components (e.g., currents, voltages, etc.), parasitic information of circuit components (e.g., resistances, capacitances, inductances, etc.), constraints or properties associated with or captured on circuit components (e.g., constraints captured on a net instance), membership information to net objects, or any other suitable information associated with a circuit component.

At 224D, the method or system may optionally represent the first design data and the second design data in a common format such as a data exchange format, a SPICE netlist format, or other suitable formats for various general purpose circuit simulators. For example, the method or system may generate a first partial netlist for a PCB design with a PCB design tool and a second partial netlist for an IC design with an IC design tool. The method or system may further represent the first partial netlist and the second partial netlist in a common format. Representing the first partial netlist and the second partial netlist in a common format may include transforming one of the two partial netlists into the format of the other partial netlist or transforming both partial netlists into the common format. In some embodiments, the EDA tools may be devised to generate the respective partial netlists directly into a common format and thus require no transformation.

At 226D, the method or system may optionally check or verify whether the first design data are correctly connected to the second design data. More details about checking or verifying whether the first design data and the second design data are correctly connected are described in U.S. patent application Ser. No. 14/503,406 filed concurrently and entitled "METHOD, SYSTEM, AND COMPUTER PROGRAM PRODUCT FOR CHECKING, VERIFYING, OR TESTING A MULTI-FABRIC ELECTRONIC DESIGN SPANNING ACROSS MULTIPLE DESIGN FABRICS", the content of which is hereby expressly incorporated in this application by reference for all purposes.

At 228D, the method or system may represent the first design data and the second design data with textual, graphical, or both textual and graphical emphasis and/or one or more markers based at least in part upon the first design related information and/or the second design related information. For example, the method or system may receive a request for probing a net that spans across multiple design fabrics. In response to the request, net segments, interconnected circuit components, and devices are identified. The method or system further identifies the design related information such as electrical data from simulations, parasitic information from extraction, etc. associated with the net segments, circuit components, and devices in these multiple design fabrics.

The method or system may, for example, highlight the graphical representation of the identified circuit components, net segments, and devices to distinguish them from the rest of the design. The method may further use various graphical, textual, or both graphical and textual indicators to signify the availability of the design related information. For example, the method or system may attach one or more graphical identifiers to a net segment (e.g., at both the source pin and the destination pin of the net segment) to indicate the availability of, for example, the current carried by the net, delay information for the net, etc. The graphical identifiers attached to the pins may also indicate the availability of design related information (e.g., operating voltages) at the pins. The method or system may use different identifiers or same identifier with different color schemes to indicate different categories of design related information in some embodiments. The method or system may identify at least a part of the first design related information and/or the second design related information at 230D and represent the at least a part of the first design related information and/or the second design related information in a user interface at 232D.

Figure 2F:
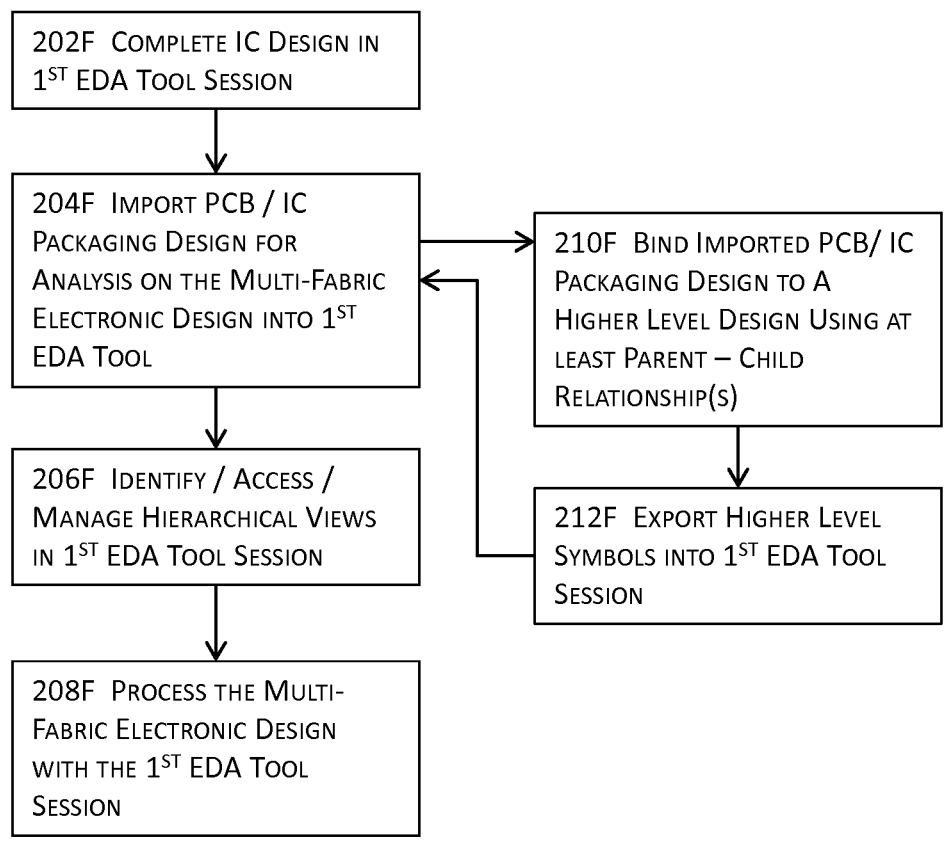
FIG. 2F illustrates a block diagram of a method or system for probing or netlisting a multi-fabric electronic design across multiple design fabrics in some embodiments.

FIG. 2F illustrates a block diagram for a method or system for probing or netlisting a multi-fabric electronic design across multiple design fabrics in some embodiments. More specifically, FIG. 2F illustrates a block diagram for binding models to circuit component designs and managing model binding across multiple design fabrics in an multi-fabric electronic design in some embodiments. In these embodiments, the method or system may complete an IC design or identify a completed IC design in a first session of a first EDA tool (e.g., an IC design tool) at 202F. The method or system may further import a PCB design and/or an IC packaging design into the first session of the first EDA tool for analyzing the multi-fabric electronic design including the IC design and at least one of the PCB design and the IC packaging design at 204F.

The imported PCB design and/or the IC packaging design may be referred to as the PCB project and the IC packaging project, respectively. These projects may be created by their respective EDA tools having native access to the design data in their corresponding schematic or layout designs. For example, a PCB project may be created by a PCB editor; and an IC packaging project may be created the IC packaging design tool in these embodiments. In some other embodiments, one or more of these projects may be created by the first EDA tool to which the detailed design data corresponding to these projects are non-native.

The method or system may further bind the imported projects to higher level design (e.g., a test bench design for the PCB project and the IC packaging projects) at 210F by using, for example, a parent-child relationship that describes the which child models or instances are included in or associated with which other parent model(s) or instance(s), or which parent model or instance includes other child model(s) or instance(s) in the multi-fabric electronic design. Once the method or system binds the projects to a higher level design, the method or system may export one or more symbols at the higher level hierarchy into the first session of the first EDA tool at 212F. The method or system may further identify, access, or manage various hierarchical views in the design hierarchy of the multi-fabric electronic design in the first session of the first EDA for the desired analysis at 206F.

In these embodiments, the method or system may identify the proper views or models for the IC designs, the IC packaging designs, and/or the PCB design at 206F. For example, the method may identify the appropriate model for a circuit block, which may correspond to multiple models, depending upon, for instance, the accuracy requirements of the analysis. The method or system may then analyze the multi-fabric electronic design using the first session of the first EDA tool.

Similar approaches may also complete a PCB design or identify a completed PCB design, import the IC packaging designs and the IC designs as projects into a PCB analysis tool, and proceed through a substantially similar process to process the multi-fabric electronic design in the PCB analysis tool at 208F. Processing the multi-fabric electronic design may include, for example, implementing, analyzing or simulating, checking, netlisting, and/or probing the multi-fabric electronic design or a portion thereof in some embodiments.

For example, the method or system may import a PCB design and an IC packaging design into an IC design tool for analysis. The IC design data are, as previously described, native to the IC design tool, and thus the method or system may simply refer to, for example, the IC design database to determine the appropriate models for representing various IC designs in the multi-fabric electronic design. Nonetheless, the IC design tool may have no visibility or knowledge of the IC packaging designs and the PCB design that may have their own design data database(s). Without the knowledge or visibility of the respective design data of the PCB design and the IC packaging designs, the method or system may not be able to identify which models are to be used in the multi-fabric electronic design to be analyzed.

The method or system may thus use the parent-child relationship to identify and export the models (e.g., a netlist, a complex model, etc.) or symbols (e.g., symbolic representation) for the PCB design and the IC packaging designs to the IC design tool. In this manner, the method or system may identify an appropriate model for a circuit design based on, for example, the analysis requirements. For example, a parent-child relationship for a PCB design may be expressed as the following table:

TABLE 1

| CHILD | PARENT |
| --- | --- |
| $R_{PCB}$ | TOP |
| Res_Schematic | $R_{PCB}$ |

TABLE 1-continued

| CHILD | PARENT |
|---|---|
| Res_VerilogA | $R_{PCB}$ |
| Res_Simulate | $R_{PCB}$ |
| Sub-Component_of_Res | Res _Schematic |

In the above table, the multi-fabric electronic design includes $R_{PCB}$ as the top level instance or model in the hierarchy which further includes, at the next lower hierarchical level, the instances or models Res_Schematic, Res_VerilogA, and Res_Spectre, each of which represent an instance or a model corresponding to the Res circuit design block. In other words, the $R_{PCB}$ circuit design block may be associated with multiple models—Res_Schematic, Res_VerilogA, and Res_Simulate. Depending on the requirements of the analysis (e.g., accuracy of the analysis results), the method or system may utilize different models for $R_{PCB}$. The Res_Schematic may further include the Sub-Component_of_Res as a child in the parent-child relationship. It shall be noted that the aforementioned tabular parent-child relationship merely illustrates one way in which the parent-child relationship may be implemented and is not intended and shall not be construed as limiting the scope of the description or the scope of the claims.

Figure 2G:
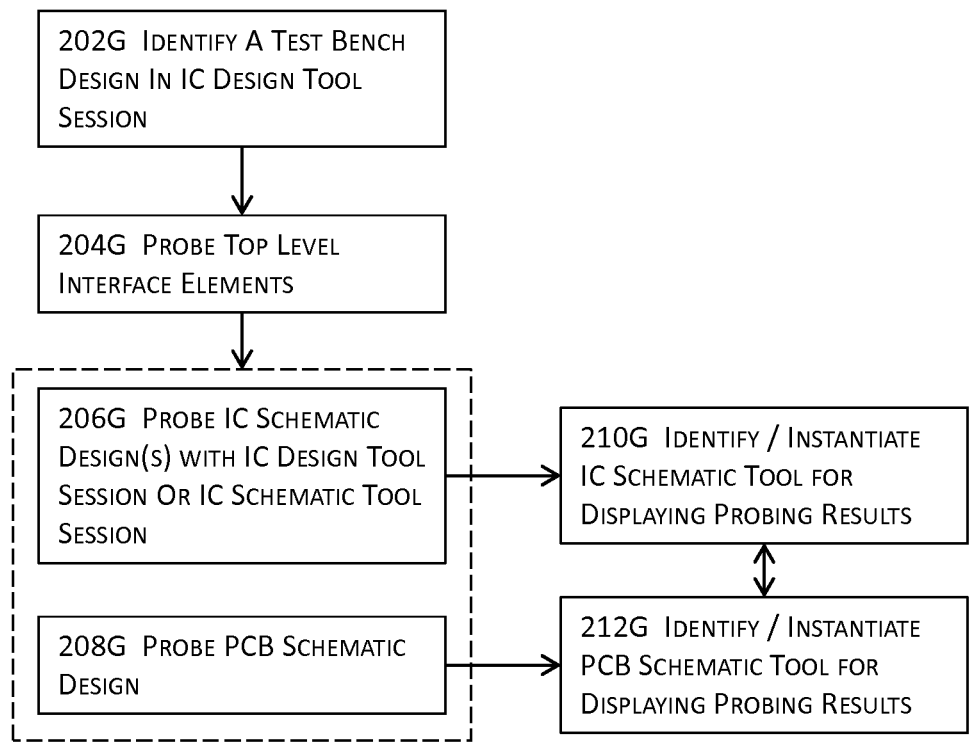
FIG. 2G illustrates a block diagram of a method or system for probing or netlisting a multi-fabric electronic design across multiple design fabrics in some embodiments.

FIG. 2G illustrates an example approach for cross probing a multi-fabric electronic design across multiple design fabrics in some embodiments. In these embodiments, a test bench design may be identified or opened in an IC design tool at 202G. The test bench design may include the PCB design and one or more IC designs. The IC packaging designs are omitted in this example for the ease of illustration and explanation. The method or system may probe the top level interface elements (e.g., nets, terminals, pins, pads, ports, etc. in the test bench design) at 204G.

Probing the top level interface elements may instantiate or cause to instantiate probing, for example, the IC schematic design with the IC design tool session (if the IC design tool may natively access the IC schematic) or the IC schematic tool at 206G as well as probing the PCB schematic design with a PCB design tool session at 208G. Probing the IC schematic design may instantiate or cause to instantiate the IC schematic tool for displaying the probing results at 210G, if the IC design tool session is not an IC schematic tool session. Probing the PCB schematic design at 208G may further instantiate or cause to instantiate a PCB schematic tool session for displaying the probing results at 212G.

FIG. 3A further illustrates that the printed circuit board design 304 includes an interconnect 350 connects a first point within the second IC design 314 and a second point within the third IC design 312. The interconnect 350 crosses the boundary of the second IC design 314 in the IC design fabric, the boundary of the IC packaging design 306 in the IC packaging design fabric into the PCB design fabric, the boundary of IC packaging design 308 in the IC packaging design fabric, and the boundary of the third IC design 312 in the IC design fabric. Once the cross-fabric simulation results have been obtained, the method or system may display the simulation results for the interconnect 350, although interconnect 350 spans across multiple design fabrics.

For example, the user may identify interconnect 350 by, for example, click on any part of the interconnect in any design fabric either in the graphic user interface showing the portion of the multi-fabric electronic design including the part of the interconnect or in an expandable and collapsible, textual tree structure of the multi-fabric electronic design in a hierarchical and/or fabric-specific manner. The user may further optionally specify what level of simulation results is to be retrieved or displayed for which part of the interconnect 350. For example, the user may specify to see the simulation results for the interconnect segment of the interconnect 350 in only the PCB fabric or only the interconnect segment at the IC packaging design hierarchical level. If the user does not specify the level of simulation results to be displayed, the method or system may retrieve and display the default level of simulation results.

For example, the method or system may retrieve and display only the simulation results in the fabric and at the hierarchical level that correspond to the part of the interconnect being identified by the user in some embodiments. As another example, the method or system may retrieve and display the entire simulation results for the entire interconnect in all of the fabrics and all of the hierarchical levels across which the interconnect spans in some other embodiments. In response to the user's identification of the interconnect 350 and optionally on the user's specification of the level of simulation results, the method or system may identify appropriate connectivity information for the identified interconnect in the desired fabrics and/or at the desired hierarchical level, and use the appropriate connectivity information to retrieve the corresponding simulation results for display in a user interface.

FIG. 3A illustrates a simplified representation of an electronic design in some embodiments. In these embodiments, the simplified representation of electronic design includes the test bench 302 at a first hierarchical level. The test bench 302 may further include a representation (e.g., a symbolic representation) of the printed circuit board 304 at a second hierarchical level. The test bench 302 may also include multiple interconnects from, for example, various power or ground rails to the printed circuit board 304. The printed circuit board 304 may also include a discrete component 320 situated at a third hierarchical level with the two IC packaging. The printed circuit board 304 may include the first IC packaging 306 and the second IC packaging 308 situated at a third hierarchical level, both of which may also be represented in one or more representations (e.g., a symbolic representation or schematic representation).

The first IC packaging 306 may include a second IC 314 and a first IC 310 that further includes a discrete component 318. The second IC packaging 308 may also include a third IC 312 and a fourth IC 316 situated at a fourth hierarchical level as the first IC 310 and the second IC 314. In some embodiments, one or more integrated circuit design EDA tools (e.g., an IC schematic editor, IC layout tool, etc.) may be used to generate, modify, or otherwise access the design data of the integrated circuit designs 310, 314, 312, and 316, whereas IC packaging design tools or printed circuit board design tools only receive symbolic representations of these integrated circuit designs. In these embodiments, IC packaging design tools may be used to generate, modify, or otherwise access the design data (e.g., schematic design data, physical design data, etc.) of the IC packaging designs 306 and 308, whereas the one or more integrated circuit design EDA tools and the printed circuit board design tools may only receive symbolic representations of the IC packaging 306 and 308.

In these embodiments illustrated in FIG. 3A, the printed circuit board design 304 also includes an interconnect that connects the second IC 314 and the third IC 312 across the boundaries of the first IC packaging 306 and the second IC packaging 308. Moreover, one or more printed circuit board design tools may be used to generate, modify, or otherwise access the design data (e.g., schematic or physical design data) of the printed circuit board, whereas the one or more IC design EDA tools and the IC packaging design tools may only receive a symbolic representation of the printed circuit board design.

The test bench design including the integrated circuit designs, the IC packaging designs, the printed circuit boards, one or more discrete components, and interconnections at the test bench level may be implemented in an integrated circuit design tool (e.g., an IC schematic tool for editing and/or simulating schematic designs of integrated circuit designs or for transmitting to and receiving from the physical designs, etc. or an IC layout tool for implementing or modifying layouts of or analyzing integrated circuit designs) because IC design tools have gone through extensive development and often includes various design environments or tools such as schematic editors, analog design tools, layout tools, RF design tools, various simulators (e.g., SPICE or SPICE-like simulators) as well as various libraries.

Integrated circuit design tools are also well integrated with post-layout verification and closure tools and may thus provide more functionalities and diverse capabilities than printed circuit board design tools or IC packaging design tools. FIG. 3A further illustrates that the printed circuit board design 304 includes an interconnect 350 connects a first point within the second IC design 314 and a second point within the third IC design 312. The interconnect 350 crosses the boundary of the second IC design 314 in the IC design fabric, the boundary of the IC packaging design 306 in the IC packaging design fabric into the PCB design fabric, the boundary of IC packaging design 308 in the IC packaging design fabric, and the boundary of the third IC design 312 in the IC design fabric.

Figure 3B:
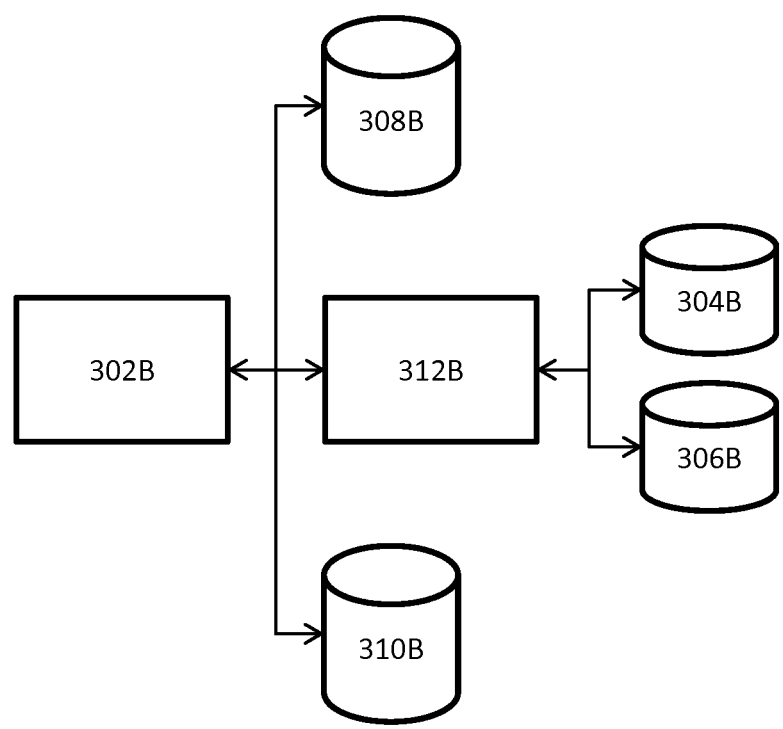
FIG. 3B illustrates a cluster of computing systems that may be used to implement various techniques and methodologies for a multi-fabric design environment described herein in some embodiments.

FIG. 3B illustrates a cluster of computing systems that may be used to implement various techniques and methodologies for a multi-fabric design environment described herein in some embodiments. The multi-fabric design environment may include the test bench fabric, the printed circuit board and packaging fabric, and the die fabric. In some of these embodiments, the multi-fabric design environment may include an IC packaging fabric and a printed circuit board fabric. The multi-fabric design environment may include one or more test bench design databases 308B in the test bench fabric, one or more IC design databases 310B in the die fabric, one or more IC packaging design databases 304B and one or more printed circuit board design data databases 306B in the fabric.

In some embodiments where the multi-fabric design environment includes a printed circuit board fabric and a separate IC packaging fabric, the multi-fabric design environment may include one or more IC packaging design data databases 304B in the IC packaging fabric and one or more PCB design data databases 306B in the PCB fabric. The multi-fabric design environment may further include one or more IC design tools (e.g., 302B) such as an IC schematic suite or an IC layout suite for manipulating the native schematic or physical design data of integrated circuit designs in the die fabric. The multi-fabric design environment may also include one or more PCB design tools (e.g., 312B) for manipulating the native schematic or physical design data of PCB designs in the PCB/IC packaging fabric or in the dedicated PCB fabric. The multi-fabric design environment may also include one or more IC packaging design tools (e.g., 312B) for manipulating the native schematic or physical design data of IC packaging designs in the PCB/IC packaging fabric 316B or in the dedicated IC packaging fabric.

Figure 3C:
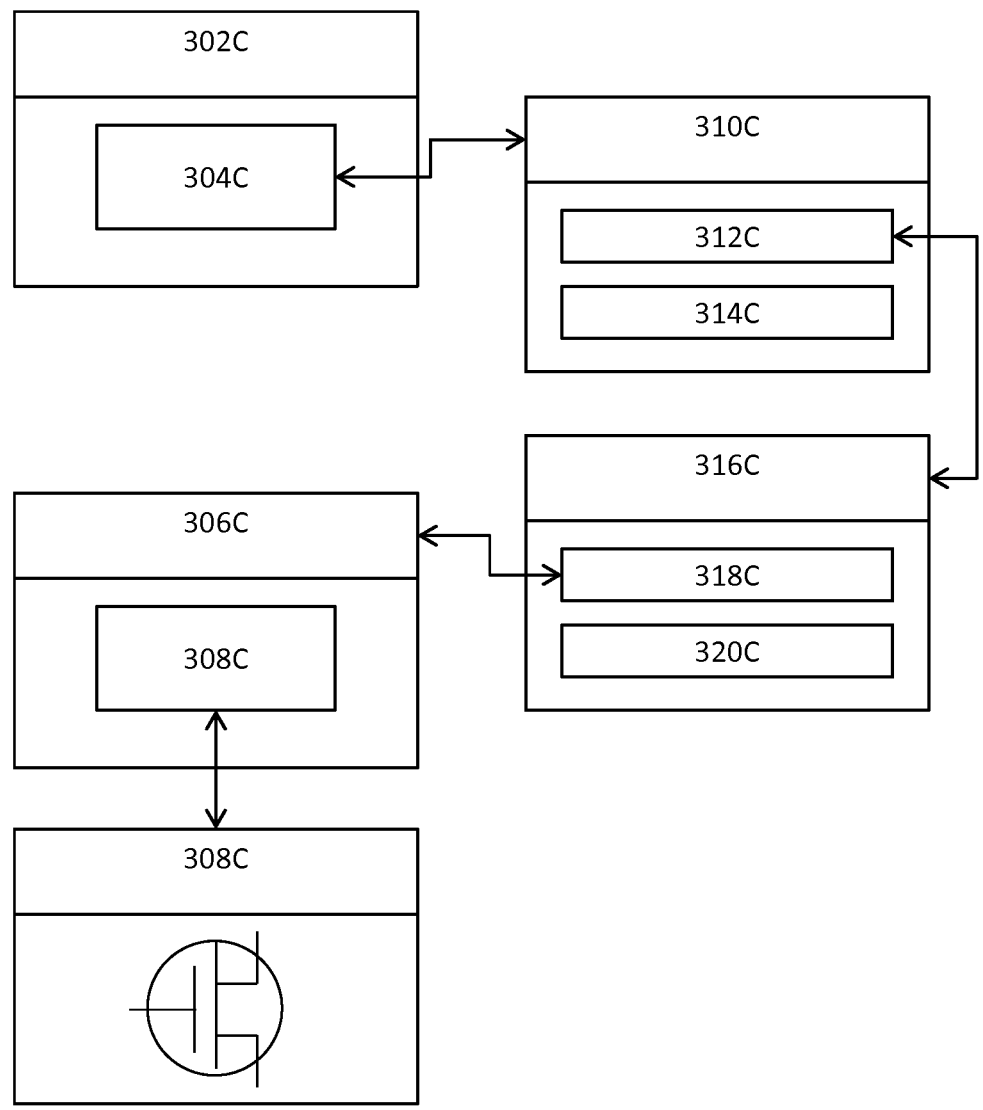
FIG. 3C illustrates a simplified test bench design including various instances to which various techniques and methodologies apply in some embodiments.

FIG. 3C illustrates a simplified test bench design including various instances to which various techniques and methodologies apply in some embodiments. More specifically, the simplified test bench design may include, at the first hierarchical level, the test bench design 302C including an instance 304C of a printed circuit board on a first EDA tool. The test bench design 302C may be implemented in one or more IC design tool such as an integrated circuit schematic suite or an integrated circuit layout suite to leverage the more complete and advanced editing, simulation, and/or analysis capabilities of such design tools and also to leverage the better integrated verification and/or design closure tools such as various post-layout verification tools. The test bench design 302C may exist in the test bench fabric and includes the symbolic view of the PCB design. When specific design data in the instance 304C of the PCB are inquired into or needed, the first EDA tool may identify or initiate an instance of a second EDA tool that is built to manipulate the native design data of PCB designs.

The second EDA tool may open the pertinent design data or a view 310C including the pertinent design data of the instance 304C of the PCB. The method or system described herein may further establish a correlation or link between the pertinent design data or view 310C of the PCB and the instance 304C of the PCB in the test bench 302C by using, for example a data structure to store the correlation or link. The second EDA tool may thus load the pertinent design data or view 310C that further includes a symbolic views of a first IC packaging design 312C and a symbolic view of a second IC packaging design 314C. The PCB design 310C may thus exist in the PCB fabric including symbolic views of IC packaging designs. When the design data of the IC packaging designs (e.g., 312C or 314C) are needed, the method or system may further identify or instantiate a third EDA tool (e.g., an IC packaging design tool) to load, for example, the pertinent design data or view 316C of IC packaging design 312C.

The third EDA tool may load the pertinent design data or view 316C that further includes a first die design 318C and a second die design 320C. The pertinent design data or view 316C of the IC packaging design 312C may exist in the IC packaging fabric and thus includes only the symbolic views of the die designs 318C and 320C. When the design data (e.g., schematic design data or layout data) of the die design (e.g., the first die design 318C) are needed, the third EDA tool may identify or instantiate the appropriate EDA tool (e.g., the IC schematic tool or IC layout tool) to open the pertinent design data or view (e.g., 306C) for the die design (e.g., 318C). In these embodiments illustrated in FIG. 3C, the pertinent design data or view 306C for the symbolic view 318C of the first die design includes further details of the design (e.g., schematic design of a field effect oxide or FET as shown in 308C) in the IC design fabric.

System Architecture Overview

Figure 4:
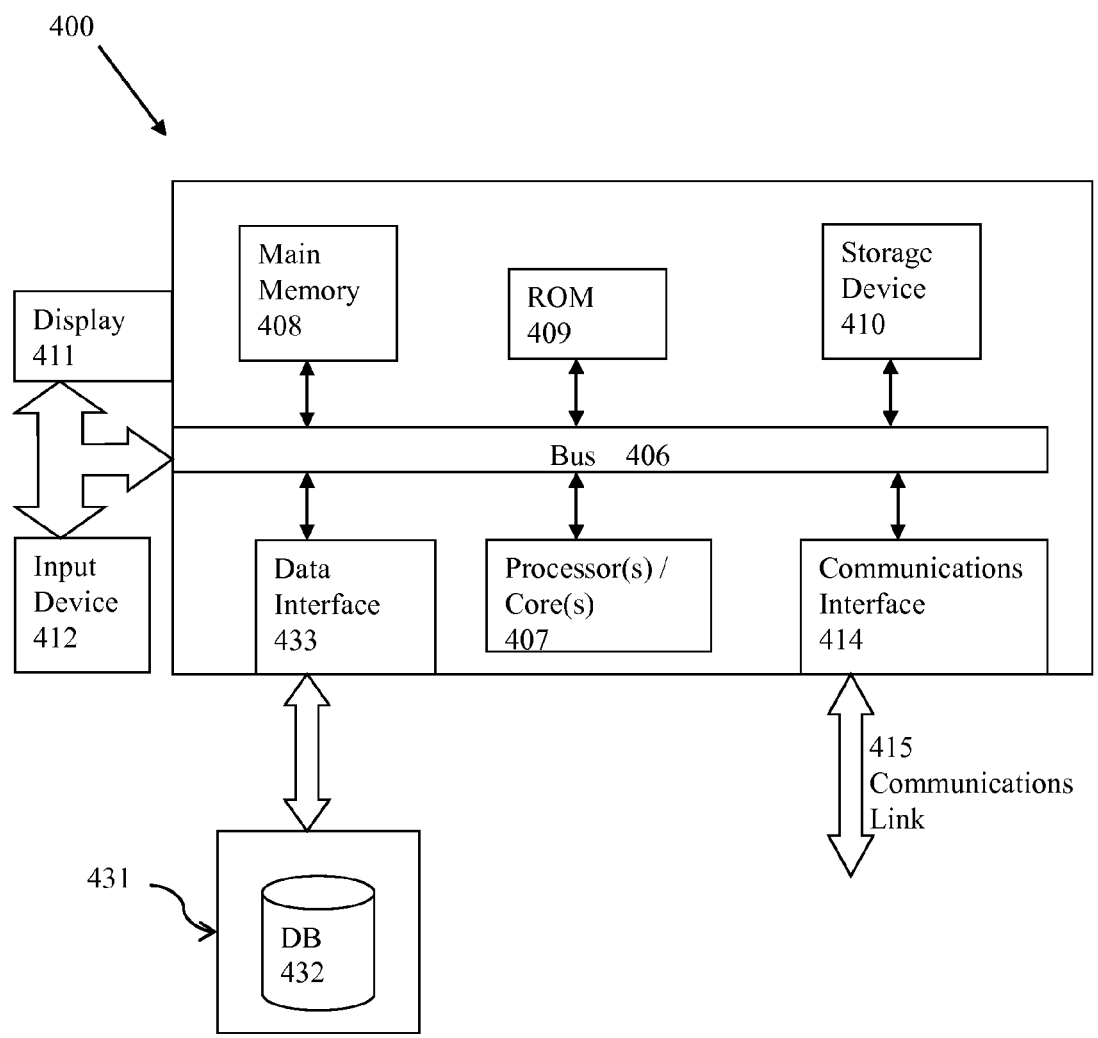
FIG. 4 illustrates a computerized system on which a method for implementing, verifying or checking, and/or analyzing a multi-fabric electronic design across multiple design fabrics may be implemented.

FIG. 4 illustrates a block diagram of a simplified illustration of a computing system 400 suitable for FIG. 4 illustrates a computerized system on which a method for probing or netlisting a multi-fabric electronic design across multiple design fabrics as described in the preceding paragraphs with reference to various figures. Computer system 400 includes a bus 406 or other communication mechanism for communicating information, which interconnects subsystems and devices, such as processor 407, system memory 408 (e.g., RAM), static storage device 409 (e.g., ROM), disk drive 410 (e.g., magnetic or optical), communication interface 414 (e.g., modem or Ethernet card), display 411 (e.g., CRT or LCD), input device 412 (e.g., keyboard), and cursor control (not shown).

According to one embodiment, computer system 400 performs specific operations by one or more processor or processor cores 407 executing one or more sequences of one or more instructions contained in system memory 408. Such instructions may be read into system memory 408 from another computer readable/usable storage medium, such as static storage device 409 or disk drive 410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 407, where the one or more processors, one or more processor cores, or combination thereof executes one or more threads. For example, the act of specifying various net or terminal sets or the act or module of performing verification, simulation, design checking, netlisting, probing, simulations, analyses, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any medium that participates in providing instructions to processor 407 for execution. Such a medium may take many forms, including but not limited to, non-volatile media and volatile media. Non-volatile media includes, for example, optical or magnetic disks, such as disk drive 410. Volatile media includes dynamic memory, such as system memory 408. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 400. According to other embodiments of the invention, two or more computer systems 400 coupled by communication link 415 (e.g., LAN, PTSN, or wireless network) may perform the sequence of instructions required to practice the invention in coordination with one another.

Computer system 400 may transmit and receive messages, data, and instructions, including program, i.e., application code, through communication link 415 and communication interface 414. Received program code may be executed by processor 407 as it is received, and/or stored in disk drive 410, or other non-volatile storage for later execution. In an embodiment, the computer system 400 operates in conjunction with a data storage system 431, e.g., a data storage system 431 that includes a database 432 that is readily accessible by the computer system 400. The computer system 400 communicates with the data storage system 431 through a data interface 433. A data interface 433, which is coupled to the bus 406 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 433 may be performed by the communication interface 414.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for probing or netlisting a multi-fabric design in a multi-fabric design environment, comprising:
    using at least one processor to perform a process, the process comprising:
    identifying a request for processing at least a portion of a multi-fabric electronic design;
    determining a first partial listing of one or more first circuit components in response to the request by at least identifying first design data in a first design fabric of the one or more first circuit components using a first session of a first electronic design automation (EDA) tool;
    automatically transmitting a request for action related to the one or more first circuit components from the first session to a second session of a second EDA tool; and
    determining a second partial listing of one or more second circuit components by at least identifying second design data of the one or more second circuit components in a second design fabric using the second session of the second EDA tool.

2. The computer implemented method of claim 1, wherein the processing the at least the portion of the multi-fabric electronic design includes netlisting the multi-fabric electronic design, and the process further comprises:
    aggregating the first partial listing and the second partial listing; and
    generating a netlist to incorporate a net based at least in part upon results of aggregating the first partial listing and the second partial listing.

3. The computer implemented method of claim 1, wherein the processing the at least the portion of the multi-fabric electronic design includes probing the multi-fabric electronic design, and the process further comprises:
    identifying first design data for the first partial listing in a first design fabric, wherein the first design data are native to the first EDA tool and non-native to the second EDA tool;
    identifying second design data for the second partial listing in a second design fabric, wherein the second design data are native to the second EDA tool and non-native to the first EDA tool; and
    representing at least a part of the first design data and the second design data with graphical or textual emphasis.

4. The computer implemented method of claim 1, the process further comprising at least one of:
    representing the first design data as one or more first symbolic views in the second session of the second EDA tool; and
    representing the second design data as one or more second symbolic views in the first session of the first EDA tool.

5. The computer implemented method of claim 1, wherein the act of automatically transmitting the request for action comprises:
  determining pertinent information for crossing from the first design fabric into the second design fabric based at least in part upon the one or more first circuit components; and
  transmitting the pertinent information from the first session of the first EDA tool to the second session of the second EDA tool.

6. The computer implemented method of claim 5, wherein automatically transmitting the request for action further comprises:
  continuing to process the multi-fabric electronic design in the second design fabric using the second session of the second EDA tool based at least in part upon the pertinent information.

7. The computer implemented method of claim 1, the process further comprising:
  identifying first design related information for the one or more first circuit components; and
  identifying second design related information for the one or more second circuit components, wherein the first design related information or the second design related information includes electrical data or parasitic data.

8. The computer implemented method of claim 7, further comprising:
  representing the first design data with textual and/or graphical emphasis; and
  representing the second design data with the textual and/or graphical emphasis, wherein the textual and/or graphical emphasis is selected based at least in part upon the first design related information and/or the second design related information.

9. The computer implemented method of claim 1, the process further comprising:
  binding a circuit design component or device of the second design data in the first session of the first EDA tool with one or more models by using at least a parent-child relationship data structure.

10. The computer implemented method of claim 1, the process further comprising:
  representing the first design data in the first design fabric and the second design data in the second design fabric in a same format; and
  combining the first design data and the second design data in the same format into a netlist for the multi-fabric electronic design.

11. The computer implemented method of claim 1, in which the first session accesses the first design data, the second session accesses the second design data, and the first EDA tool and the second EDA tool do not share design data of the multi-fabric electronic design.

12. The computer implemented method of claim 1, wherein the multi-fabric electronic design includes a partial, incomplete design that includes no design data for at least one design component, and the multi-fabric electronic design does not satisfy one or more design rules or constraints before the request for processing the multi-fabric electronic design is fulfilled.

13. An article of manufacture comprising a non-transitory computer accessible storage medium having stored thereupon a sequence of instructions which, when executed by at least one processor or at least one processor core executing one or more threads, causes the at least one processor or the at least one processor core to perform a process for probing or netlisting a multi-fabric design in a multi-fabric design environment, the process comprising:
  identifying a request for processing at least a portion of a multi-fabric electronic design;
  determining a first partial listing of one or more first circuit components in response to the request by at least identifying first design data in a first design fabric of the one or more first circuit components using a first session of a first electronic design automation (EDA) tool;
  automatically transmitting a request for action related to the one or more first circuit components from the first session to a second session of a second EDA tool; and
  determining a second partial listing of one or more second circuit components by at least identifying second design data in a second design fabric of the one or more second circuit components using the second session of the second EDA tool.

14. The article of manufacture of claim 13, wherein the processing the at least the portion of the multi-fabric electronic design includes netlisting the multi-fabric electronic design, and the process further comprises:
  aggregating the first partial listing and the second partial listing; and
  generating a netlist to incorporate a net based at least in part upon results of aggregating the first partial listing and the second partial listing.

15. The article of manufacture of claim 13, wherein the processing the at least the portion of the multi-fabric electronic design includes probing the multi-fabric electronic design, and the process further comprises:
  identifying first design data for the first partial listing in a first design fabric, wherein the first design data are native to the first EDA tool and non-native to the second EDA tool;
  identifying second design data for the second partial listing in a second design fabric, wherein the second design data are native to the second EDA tool and non-native to the first EDA tool; and
  representing at least a part of the first design data and the second design data with graphical or textual emphasis.

16. The article of manufacture of claim 13, wherein the act of automatically transmitting the request for action comprises:
  determining pertinent information for crossing from the first design fabric into the second design fabric based at least in part upon the one or more first circuit components;
  transmitting the pertinent information from the first session of the first EDA tool to the second session of the second EDA tool; and
  continuing to process the multi-fabric electronic design in the second design fabric using the second session of the second EDA tool based at least in part upon the pertinent information.

17. A system for probing or netlisting a multi-fabric design in a multi-fabric design environment, comprising:
  non-transitory computer accessible storage medium storing thereupon program code; and
  at least one processor executing the program code to identify a request for processing at least a portion of a multi-fabric electronic design; determine a first partial listing of one or more first circuit components in response to the request by at least identifying first design data in a first design fabric of the one or more first circuit components using a first session of a first electronic design automation (EDA) tool; automatically transmit a request for action related to the one or more first circuit components from the first session to a second session of a second EDA tool; and determine a second partial listing of one or more second circuit components by at least identifying second design data in a second design fabric of the one or more second circuit components using the second session of the second electronic design automation (EDA) tool.

18. The system of claim 17, the at least one processor further executing the program code to aggregate the first partial listing and the second partial listing; and generate a netlist to incorporate the net based at least in part upon results of aggregating the first partial listing and the second partial listing, wherein the processing the at least the portion of the multi-fabric electronic design includes netlisting the multi-fabric electronic design.

19. The system of claim 17, the at least one processor further executing the program code to identify first design data for the first partial listing in a first design fabric, wherein the first design data are native to the first EDA tool and non-native to the second EDA tool; identify second design data for the second partial listing in a second design fabric, wherein the second design data are native to the second EDA tool and non-native to the first EDA tool; and represent at least a part of the first design data and the second design data with graphical or textual emphasis, wherein the processing the at least the portion of the multi-fabric electronic design includes probing the multi-fabric electronic design.

20. The system of claim 17, the at least one processor further executing the program code to determine pertinent information for crossing from the first design fabric into the second design fabric based at least in part upon the one or more first circuit components; transmit the pertinent information from the first session of the first EDA tool to the second session of the second EDA tool; and continue to process the multi-fabric electronic design in the second design fabric using the second session of the second EDA tool based at least in part upon the pertinent information.

\* \* \* \* \*